US00RE48835E

(19) United States
(12) Reissued Patent
Martin et al.

(10) Patent Number: US RE48,835 E
(45) Date of Reissued Patent: Nov. 30, 2021

(54) NETWORK ADDRESSABLE STORAGE CONTROLLER WITH STORAGE DRIVE PROFILE COMPARISON

(71) Applicant: Rubrik, Inc., Palo Alto, CA (US)

(72) Inventors: Timothy Rex Martin, Seattle, WA (US); Jeffrey Douglas Hughes, Seattle, WA (US); Triantaphyllos Byron Rakitzis, Seattle, WA (US); Kiran V. Bhageshpur, Seattle, WA (US)

(73) Assignee: Rubrik, Inc., Palo Alto, CA (US)

(21) Appl. No.: 15/650,734

(22) Filed: Jul. 14, 2017

Related U.S. Patent Documents

Reissue of:

(64) Patent No.: 9,081,828
Issued: Jul. 14, 2015
Appl. No.: 14/596,179
Filed: Jan. 13, 2015

U.S. Applications:

(63) Continuation-in-part of application No. 14/266,603, filed on Apr. 30, 2014, now Pat. No. 8,935,567.

(51) Int. Cl.
*G06F 11/30* (2006.01)
*G06F 11/20* (2006.01)
(Continued)

(52) U.S. Cl.
CPC ..... *G06F 11/3055* (2013.01); *G06F 11/008* (2013.01); *G06F 11/0727* (2013.01);
(Continued)

(58) Field of Classification Search
CPC .. G06F 11/3055; G06F 11/008; G06F 11/201; G06F 11/3034; G06F 11/2017;
(Continued)

(56) References Cited

U.S. PATENT DOCUMENTS 5,838,891 A 11/1998 Mizuno et al.
6,073,209 A 6/2000 Bergsten
(Continued)

FOREIGN PATENT DOCUMENTS

EP 3167597 5/2017
WO 2004095304 A1 11/2004
WO 2015167898 11/2015

OTHER PUBLICATIONS

European Communication and Search Report for European Application No. 15785565.1, dated May 11, 2018, 10 pages.
(Continued)

*Primary Examiner* — Luke S Wassum
(74) *Attorney, Agent, or Firm* — Schwegman Lundberg & Woessner, P.A.

(57) ABSTRACT

Embodiments are directed towards a controller that provides individual network accessibility to a storage drive. The controller may include a first connector operative to couple with a storage-drive connector, a second connector operative to couple with a backplane connector of a multi-storage-drive chassis, memory, and processor. The controller may convert communication received through the first connector into an Ethernet protocol for output through the second connector, and convert communication received through the second connector into a storage-drive protocol for output through the first connector. A physical shape of the controller may fit adjacent to the storage-drive connector and occupy less space than is bounded by peripheral edges of an end of a separate housing of a storage drive coupled to the storage-drive connector. The controller may manage power provided to the storage drive and may coordinate with other controllers to manage power-up sequences of multiple storage drives.

35 Claims, 17 Drawing Sheets

(51) Int. Cl.
*G06F 11/00* (2006.01)
*G06F 11/07* (2006.01)
*G06F 11/14* (2006.01)

(52) U.S. Cl.
CPC ..... *G06F 11/201* (2013.01); *G06F 11/3034* (2013.01); *G06F 11/3058* (2013.01); *G06F 11/0751* (2013.01); *G06F 11/1461* (2013.01); *G06F 11/2005* (2013.01); *G06F 11/2017* (2013.01)

(58) Field of Classification Search
CPC ..... G06F 11/0727; G06F 11/3058; G06F 11/0751; G06F 11/2005; G06F 11/1461; G06F 11/3062
See application file for complete search history.

(56) References Cited

U.S. PATENT DOCUMENTS 6,807,642 B2 10/2004 Yamamoto et al.
6,959,344 B2 * 10/2005 Murotani ..... G06F 11/0727 710/15
6,996,642 B2 * 2/2006 Apperley ..... G06F 3/0607 710/313
7,028,154 B2 4/2006 Reeves
7,035,972 B2 * 4/2006 Guha et al. ..... G06F 1/3203 711/114
7,133,805 B1 * 11/2006 Dankenbring et al. ..... 702/186
7,260,417 B2 * 8/2007 El-Batal ..... G06F 3/0626 320/104
7,260,423 B2 * 8/2007 Richardson ..... H04B 1/3816 455/41.1
7,337,433 B2 * 2/2008 Cyran ..... G06F 11/302 717/130
7,386,796 B1 6/2008 Simpson et al.
7,437,604 B2 10/2008 Davies et al.
7,444,532 B2 * 10/2008 Masuyama et al. ..... 713/330
7,487,283 B2 * 2/2009 Sivertsen ..... G06F 13/409 710/301
7,552,289 B2 6/2009 Hoch et al.
7,644,148 B2 1/2010 Ranganathan et al.
7,650,532 B2 1/2010 Fukui
7,861,122 B2 12/2010 Cornwell et al.
7,945,730 B2 5/2011 Daftardar
8,046,614 B2 10/2011 Henderson et al.
8,156,381 B2 4/2012 Tamura et al.
8,156,382 B1 4/2012 Booth et al.
8,589,655 B2 11/2013 Colgrove et al.
8,595,535 B1 * 11/2013 Tamilarasan ..... G06F 11/3062 713/340
8,719,619 B2 5/2014 Li et al.
8,935,567 B1 * 1/2015 Martin ..... G06F 11/1092 714/6.1
9,081,828 B1 7/2015 Martin et al.
9,239,746 B2 * 1/2016 Fahimi ..... G06F 11/0751
9,361,175 B1 * 6/2016 Bose ..... G06F 11/079
2004/0205403 A1 10/2004 Markow et al.
2005/0018341 A1 1/2005 Brume
2005/0198194 A1 * 9/2005 Burkey ..... 709/217
2005/0228943 A1 10/2005 DeCenzo et al.
2006/0224917 A1 10/2006 Kleiman et al.
2007/0074077 A1 3/2007 Markow et al. ..... G11B 27/36 714/36
2008/0005595 A1 1/2008 Spengler et al.
2008/0154920 A1 * 6/2008 Guha ..... 707/100
2009/0063719 A1 3/2009 Honjo et al.
2009/0210726 A1 * 8/2009 Song ..... G06F 11/3055 713/300
2010/0049822 A1 2/2010 Davies et al.
2010/0049914 A1 2/2010 Goodwin
2010/0082793 A1 * 4/2010 Woods ..... G06F 11/2094 709/223
2010/0153680 A1 6/2010 Baum et al.
2010/0191907 A1 7/2010 Ish
2010/0211335 A1 8/2010 Gokita
2010/0281199 A1 11/2010 Fu et al.
2010/0281298 A1 * 11/2010 Pont ..... G06F 11/30 714/10
2010/0313044 A1 * 12/2010 Rajpal ..... G06F 11/3062 713/320
2011/0307721 A1 12/2011 Ouchi et al.
2012/0151262 A1 * 6/2012 Nakayama et al. ..... 714/22
2012/0210169 A1 8/2012 Coile et al.
2012/0216200 A1 * 8/2012 Vaidyanathan ..... G06F 1/3206 718/100
2012/0311381 A1 12/2012 Porterfield
2013/0073860 A1 3/2013 Miyazaki
2013/0073880 A1 3/2013 Miyazaki
2013/0132759 A1 5/2013 Lathrop et al.
2013/0205181 A1 8/2013 Blaum et al.
2013/0219101 A1 8/2013 Hansen et al.
2013/0227352 A1 8/2013 Kumarasamy et al.
2013/0232289 A1 9/2013 Zhong et al.
2013/0312005 A1 11/2013 Chiu et al.
2013/0326269 A1 12/2013 Losh et al.
2014/0047057 A1 * 2/2014 Kuo ..... 709/211
2014/0047300 A1 2/2014 Liang et al.
2014/0068627 A1 3/2014 Goh et al.
2014/0095740 A1 4/2014 Ozawa
2014/0115390 A1 4/2014 Coile et al.
2014/0164824 A1 6/2014 Reche et al.
2014/0173306 A1 6/2014 Cooper et al.
2014/0173351 A1 6/2014 Afifi et al.
2014/0297038 A1 10/2014 Nishioka et al.
2014/0297596 A1 * 10/2014 Jeon et al. ..... 707/675
2014/0317058 A1 * 10/2014 Chang et al. ..... 707/640
2015/0370681 A1 * 12/2015 Tonry ..... G06F 11/24 702/58
2016/0085290 A1 * 3/2016 Skandakumaran ... G06F 1/3253 713/320
2016/0091948 A1 * 3/2016 Mitchell ..... G06F 1/3206 713/340
2016/0132095 A1 * 5/2016 Yang ..... G06F 3/06 713/323
2016/0179649 A1 * 6/2016 Bank ..... G06F 21/81 713/340

OTHER PUBLICATIONS

"U.S. Appl. No. 14/266,603, Notice of Allowance dated Nov. 17, 2014", 14 pgs.
"U.S. Appl. No. 14/576,095, Non Final Office Action dated Feb. 11, 2015", 15 pgs.
"U.S. Appl. No. 14/596,179, Non Final Office Action dated Apr. 29, 2015", 37 pgs.
"U.S. Appl. No. 14/596,179, Response filed May 6, 2015 to Non Final Office Action dated Apr. 29, 2015", 14 pgs.
"U.S. Appl. No. 14/596,179, Notice of Allowance dated May 18, 2015", 5 pgs.
"European Application Serial No. 15785565.1, Indication of deficiencies in a request pursuant to Rule 22 EPC dated Feb. 15, 2021", 2 pgs.
"European Application Serial No. 15785565.1, Response to Communication pursuant to Rules 161(1) and 162 EPC dated Oct. 6, 2017", 13 pgs.
"European Application Serial No. 15785565.1, Communication Pursuant to Article 94(3) EPC dated May 11, 2021", 11 pgs.
"International Application Serial No. PCT US2015 027104, International Search Report dated Aug. 5, 2015", 3 pgs.
"International Application Serial No. PCT US2015 027104, Written Opinion dated Aug. 5, 2015", 7 pgs.
"International Application Serial No. PCT US2015 027104, International Preliminary Report on Patentability dated Nov. 10, 2016", 9 pgs.
Official Communication for U.S. Appl. No. 14/576,095 mailed Feb. 11, 2015 (16 pages).

* cited by examiner

NETWORK ADDRESSABLE STORAGE CONTROLLER WITH STORAGE DRIVE PROFILE COMPARISON

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This utility patent application is a Continuation-In-Part of U.S. patent application Ser. No. 14/266,603 filed on Apr. 30, 2014, issued as U.S. Pat. No. 8,935,567 on Jan. 13, 2015, entitled "NETWORK ADDRESSABLE STORAGE CONTROLLER WITH STORAGE DRIVE PROFILE COMPARISON," the benefit of which is claimed under 35 U.S.C. §120, and which is further incorporated by reference in its entirety.

TECHNICAL FIELD

The present invention relates generally to storage drive controllers, but more particularly, but not exclusively, to a network-addressable-storage-drive controller that together with a non-specific storage drive physically fits into a driver carrier that is employed with a typical multi-storage-drive chassis.

BACKGROUND

The use of distributed storage systems has grown in abundance over the past few years. These systems often use a chassis that house multiple storage drives, where data can be distributed across the various storage drives. Typically, a single built-in chassis computer or stand-alone computer or is used as an interface between the chassis (and accordingly each storage drive) and other network computers. This master computer generally coordinates read and write operations, and sometimes data recovery operations. However, if this master computer fails, then access to the storage drives may be drastically reduced, slowed, or even blocked to all of the drives of the chassis. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
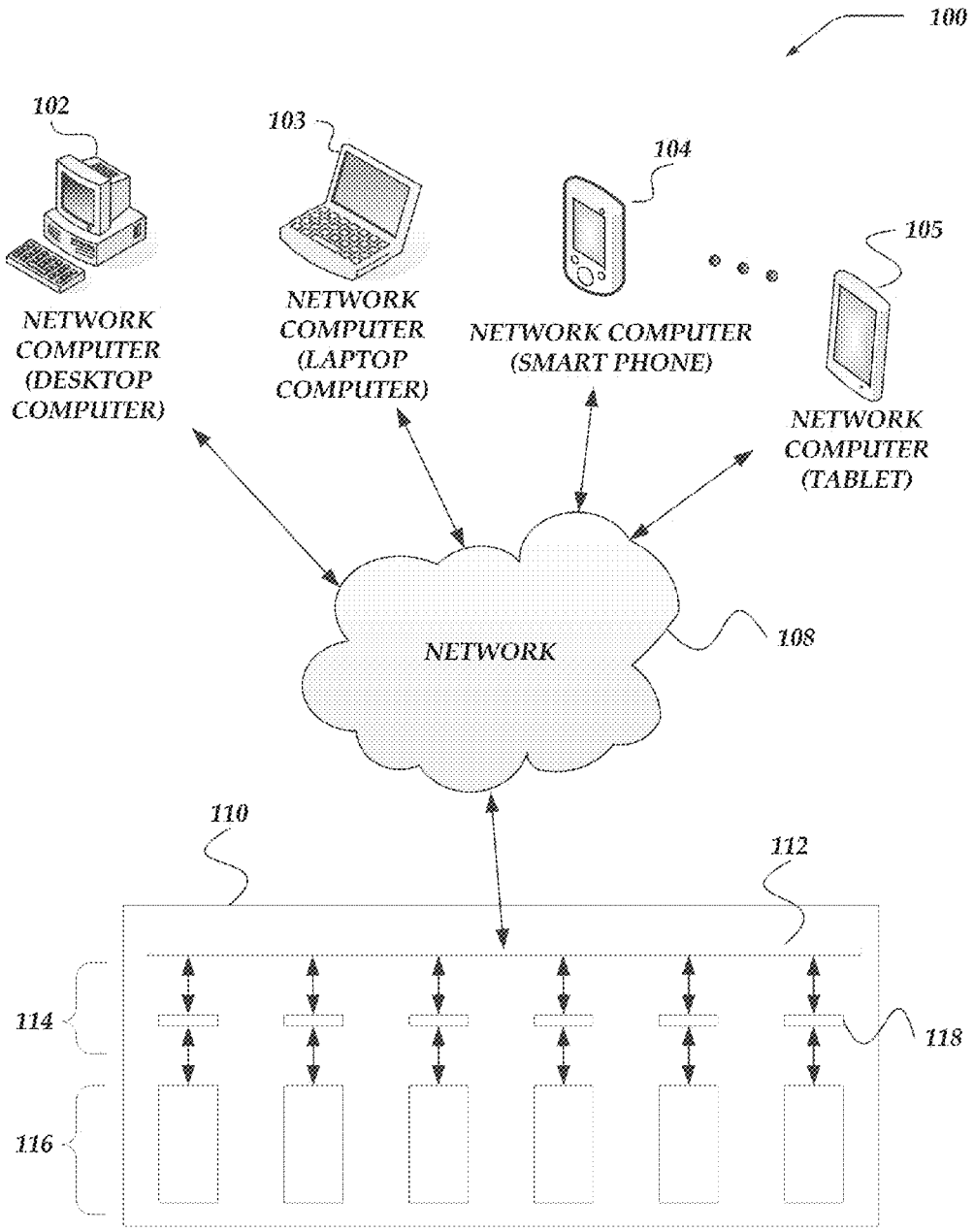
FIG. 1 is a system diagram of an environment in which embodiments of the invention may be implemented.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "multi-storage-drive chassis" refers to a storage architecture that includes a chassis, backplane, and various other circuitry (e.g., power supply, a centralized chassis controller, or the like) for enabling use of a plurality of storage drives. In some embodiments, a multi-storage-drive chassis may be in a non-RAID (non-Redundant Array of Independent Disks) architecture, such as, for example, a JBOD (or "just a bunch of disks") architecture. However, embodiments are not so limited, and in other embodiments, the multi-storage-drive chassis may be in a RAID architecture.

In various embodiments, the backplane of the chassis may include a plurality of connectors that are electrically coupled to the backplane. Some aspects of the connectivity may be in parallel; power for instance. Other connector connectivity can be star connected high speed serial. These connectors may be referred to as backplane connectors. In some embodiments, each backplane connector may be referred to as a storage-drive slot (or disk slot). The backplane connectors may enable a plurality of storage drives to electrically couple with the backplane. In at least one embodiment, the plurality of storage drives may receive power through the backplane connectors. In some embodiments, the backplane connectors may be SAS (Serial Attached SCSI (Small Computer System Interface)) connectors, SATA (Serial Advanced Technology Attachment) connectors, SCSI connectors, or other types of connectors that are compatible with a storage-drive connector, or controller, as described herein.

In various embodiments, the chassis may support storage-drive-access protocols. Often these protocols are dependent on the type of backplane connectors and/or the type of storage drive connector. For example, if the backplane connector is a SAS connector, then the chassis may be operative to support SAS protocols for accessing storage-drive data.

In at least one of various embodiments, the backplane may be modified such that at least a portion of the backplane connectors (i.e., storage-drive slots) can interface with an Ethernet switch fabric. In various embodiments, the chassis may include one or more Ethernet switches. These Ethernet switches may be integrated circuits with a plurality of ports that function by forwarding frames (or packets) between several ports. Each individual port may be serially connected to corresponding storage-drive slots (e.g., correspondingly coupled to the backplane connectors). In various embodiments, the Ethernet switch fabric in conjunction with the backplane connectors can support Ethernet protocols that can be provided over a SAS connector (or other backplane connector that can couple to a storage drive (or controller)). In some embodiments, the Ethernet switch fabric may include an Ethernet port/interface for enabling communication between the chassis (e.g., each controller) and at least one network and/or network device that is remote to the chassis. However, embodiments are not so limited; and in some other embodiments, the chassis may be modified to include a component that can detect differences between storage-drive-access protocols and Ethernet protocols. In some other embodiments, a traditional backplane may not be utilized, but rather the switch fabric may include connectors for coupling with storage drives, where these connectors include an Ethernet interface.

In various embodiments, multi-storage-drive chassis may utilize storage-drive carriers or trays to enable easy insertion and removal of the storage drives to and from the chassis. The storage-drive carriers can provide easy and consistent alignment of a storage-drive's output connector and a backplane input connector.

Also, in various embodiments, instead of wired connectors electronically coupled to a backplane, the multi-storage-drive chassis may use wireless communication to connect a plurality of storage drives to an external network. The wireless multi-storage-drive chassis embodiments may include one or more waveguides to facilitate secure and effective wireless communication with the storage drives. The one or more waveguides may be located in the chassis so that they extend from one, some, or all of the shelves of storage drives in the chassis. In various embodiments, one or more channels in the waveguides are provided. Each channel may be formed in a waveguide having a shape that facilitates the communication of wireless signals along its length, such as a substantially circular, oval, rectangular, square, triangular, or the like shape.

In various embodiments, antennas corresponding to one or more radio adapters and one or more antennas corresponding to one or more wireless controllers for the storage drives are able to wirelessly receive and transmit wireless communication signals with each other within the waveguide. The one or more radio adapters are also configured to facilitate communication between one, some or all of the wireless controllers and at least one network and/or network device that is remote to the chassis.

In various embodiments of the wireless multi-storage-drive chassis, multiple radio adapters may be located in one or more waveguides to at least facilitate system redundancy and flexible bandwidth allocation when wirelessly communicating with one or more wireless controllers. For example, in various exemplary embodiments, two or more radio adapters may be arranged in one waveguide to provide redundant wireless communication with each wireless controller in the multi-storage-drive chassis. Also, in other exemplary embodiments, multiple radio adapters may be separately located in different waveguides to provide greater wireless communication flexibility and increased communication bandwidth with different portions of the plurality of wireless storage drive controllers in the wireless multi-storage-drive chassis. For example, in various embodiments, one portion of a plurality of wave guides may be arranged to enable wireless communication between one portion of a plurality of wireless controllers. And another different portion of the plurality of wave guides may be arranged to enable wireless communication between another different portion of the plurality of radio adapters and another different portion of the plurality of wireless controllers located in the wireless multi-storage-drive chassis. Also, in various embodiments, the one or more radio adapters may be located along the length of each waveguide and/or at one or both ends of each waveguide.

Additionally, in various embodiments, one or more termination plates for wireless signals within a wave guide may be arranged at one or both ends of a waveguide to prevent reflections and standing waves of wireless communication signals within the waveguide. Also, the interior surface of one or more channels in a waveguide may be irregular to support MIMO spatial multiplexing operation based on multipath inducing geometry within the waveguide's channel. For example, the waveguide's interior surface may include symmetrical and/or non-symmetrical ridges, angles, shapes, folds, or protuberances that are placed at symmetrical and/or non-symmetrical locations along the interior surface of the waveguide's channel.

Additionally, in various embodiments, the wireless multi-storage-drive chassis is not limited for use with waveguides to provide wireless communication. Instead, the chassis may be provided without waveguides and employ one or more radio adapters that can wirelessly communicate with one or more wireless controllers separate from a waveguide. Further, in various embodiments, the chassis may be provided with waveguides for a portion of storage drives having wireless controllers, and wired connections for other storage drives having controllers with a second connector.

In various embodiments, the types of wireless communication protocols employed by the radio adapters and the wireless controllers may be a standard protocol or one of its variants, for example, WiFi (IEEE 802.11), Bluetooth (IEEE 802.15.1, WiMax (IEEE 802.16), WiMax MIMO, WiMax MISO, ZigBee (IEEE 802.15.4), MiWi (IEEE 802.15.4), or the like. The wireless communication signals may also be communicated with a modified standard wireless protocol, and/or a proprietary wireless protocol.

As used herein, the term "radio adapter" refers to an electronic component, device, computer, and the like, that is located in a wireless multi-storage-drive chassis and provides wireless communication with one or more wireless storage drive controllers. Also, in various embodiments, the radio adapter enables communication between the chassis' storage devices (i.e., each wireless controller) and at least one network and/or network device that is remote to the chassis. Also, in various embodiments, the communication with the at least one network and/or remote network device may be based on Ethernet, or the like. Additionally, in various embodiments, the radio adapter may employ a fiber optic connection, or some other high bandwidth connection, to communicate with the at least one network and/or remote network device, or the like.

In various embodiments, the radio adapter may include one or more antennas that enable communication with one or more wireless controllers and/or one or more radio adapters that are at least located in the wireless multi-storage-drive chassis. In various embodiments, the radio adapter may be configured to wirelessly communicate through a channel in a waveguide with one or more wireless controllers and/or one or more other radio adapters. In various embodiments, the radio adapter may include one or more antennas for enabling wireless communication with one or more wireless controllers and/or one or more other radio adapters that communicate outside of a waveguide.

As used herein, the term "storage drive" refers to a device for storing data. The various embodiments described herein can utilize most typical, non-specific, or general storage drive on the market (i.e., the storage drive itself does not need to include or be modified to include any circuitry, components, or the like to perform the various embodiments). Storage drives may include hard disk drives (HDD), solid state drives (SSD), optical drives, or the like.

In various embodiments, storage drives may include a housing that has two ends, a top, a bottom, and two sides. In various embodiments, a back end of the storage-drive housing may include a storage-drive connector. In at least one of various embodiments, the back end of the housing may include peripheral edges (e.g., the perimeter edges of the back end of the storage-drive housing).

Storage drives can come in many different form factors, such as, for example, 3.5 inch, 2.5 inch, 1.8 inch, 5.25 inch, 8 inch, or the like. It should be understood that the actual dimensions of the storage drive (including the housing and/or storage-drive connector) may be different that the form factor nomenclature based on industry standards. Some multi-storage-drive chassis may support only one form factor, while other multi-storage-drive chassis may support multiple form factors (e.g., backplane connectors may be compatible with storage drives having different factors and the storage-drive carriers may be adaptable for different form factors). Although the specification is primarily described in terms of storage drives having a 3.5 inch form factor, embodiments are not so limited. But, rather, other types of storage drives, form factors, and/or chassis may be employed.

Along with different form factors, storage drives can include different connectors for connecting to a multi-storage-drive-chassis backplane. These connectors may be referred to as storage-drive connectors and may be compatible with the backplane connectors. A storage-drive connector may be a SAS connector, SATA connector, universal serial bus (USB), firewire (or IEEE 1394), thunderbolt, PATA (Parallel Advanced Technology Attachment) connector, SCSI connector, Fibre Channel (FC) connector, Enhanced Integrated Drive Electronics (EIDE) connector, or the like.

Storage drives may have different power consumption profiles depending on various states of the storage drive, type of storage drive, or the like. Some of the different states of a storage drive may be an initial start-up power state; an idle state, an initial access state, and a sustained read/write state. The initial start-up power state may be when an initial amount of power is provided to the storage drive for the storage drive to provide basic communication with other devices. The idle state may be while the storage drive is awaiting a read/write request. The initial access state may be an initial amount of power required to make a read or write of the drive (e.g., an initial power required to start spinning the disk of a HDD). The sustained read/write state may be while a storage drive is fulfilling a read or write request after the initial read/write state.

As used herein, the term "controller" or "controller computer" refers to a computer or physical device that is separate from a typical/non-specific/general storage drive and separate from a multi-storage-drive chassis, but can be electrically coupled between an individual storage drive and the chassis backplane. Briefly, the controller can accept data in a storage drive supported protocol through a storage-drive connector and convert it into an Ethernet supported protocol for output through the backplane connector and over the Ethernet switch fabric interface to other network devices (or controllers). Similarly, the controller can accept data in an Ethernet supported protocol through the backplane connector and convert it to a storage drive supported protocol for output through the storage-drive connector to the storage drive. In various embodiments, each controller effectively makes each separate storage drive individually network accessible by other controllers and/or network computers.

In various embodiments, the controller may have a first connector, a second connector, a processor, memory, and other peripheral circuitry. In various embodiments, the processor and memory (and other peripheral circuitry) may be mounted on a circuit board, with the first connector and second connector positioned opposing each other on opposite sides of the board. In some embodiments, the first connector may be positioned on a first side of the board and the second connector may be positioned on a second side of the board, where the processor, memory, and periphery circuitry may be mounted to the first side, second side, or a combination thereof.

The first connector may be a connector that can couple with a storage-drive connector. And the second connector may be a connector that can couple with a backplane connector of a multi-storage-drive chassis. The first connector may be selected based on the storage-drive connector, so that the first connector and the storage-drive connector are compatible (e.g., the storage-drive connector may be a male connector, which can mate with a female first connector on the controller). In at least one of various embodiments, the first connector may be a SATA connector (but other connectors may be employed). Similarly, the second connector may be selected based on the backplane connector, so that the second connector and the backplane connector are compatible (e.g., the second connector may be a male connector, which can mate with a female backplane connector). In at least one of various embodiments, the second connector may be a SAS connector (but other connectors may be employed). In various embodiments, the types of connectors that may be utilized may include, for example, SAS connector, SATA connector, universal serial bus (USB), firewire (or IEEE 1394), thunderbolt, PATA (Parallel Advanced Technology Attachment) connector, SCSI connector, Fibre Channel (FC) connector, Enhanced Integrated Drive Electronics (EIDE) connector, or the like.

In some embodiments, the controller board may be a universal board that can accept different types of first connectors and/or second connectors. In at least one of various embodiments, a user may be enabled to affix the first connector and/or the second connector to the controller board. For example, assume a user has a multi-storage-drive chassis that includes SAS connectors as the backplane connectors, the user has three storage drives with SATA connectors and three storage drives with USB connectors. In this example, the user can put together six different controllers, three controllers with a SATA connector as first connector and a SAS connector as the second connector, and three other controllers with a USB connector as the first connector and a SAS connector as the second connector. This universal controller board can enable a user to use virtually any storage drive (with a controller-supported connector type) with virtually any multi-storage-drive chassis (with a controller-supported connector type), regardless of the storage drive and chassis having connectors that are compatible with each other.

In various embodiments, the controller may have dimensions that fit into the form factor shadow of the storage drive. As described in more detail herein, a circuit board of the controller may have a shape that fits within the dimensions of a lateral cross-section of the storage drive. Similarly, the overall size of the controller may be determined such that the controller and storage drive—when coupled together—is compatible with a drive carrier for the multi-storage-drive chassis. In various embodiments, "fitting into the form factor shadow of the storage drive" may refer to a physical shape of the controller being operative to fit adjacent to a correspondingly coupled storage drive connector and occupy less space than is bounded by peripheral edges of an end of a separate housing of a storage drive coupled to the storage drive connector. In some embodiments, this physical shape of the controller may fit into the peripheral edges of a lateral-cross second of the storage drive.

As described in more detail herein, a controller may be operative to control/manage a single storage drive. So, unlike a master computer that would control/manage a plurality of storage drives, each controller individually controls/manages its own corresponding individual storage drive. Although, in various embodiments, controllers may communicate with each other to coordinate and perform tasks between a plurality of storage drives. In some embodiments, controllers can communicate locally (without accessing the chassis interface for communication with external/remote devices) with other controllers through the Ethernet switch fabric interface of the chassis via Ethernet protocols.

In various embodiments, a controller can individually determine one or more power-up sequences and/or manage the voltage and/or power supplied to its corresponding storage drive (i.e., the storage drive that the controller is coupled to). In other embodiments, a plurality of controllers can coordinate with each other to schedule power-up sequences for a plurality of storage drives (e.g., to minimize the power spike effects of powering up multiple storage drives at the same time).

In other embodiments, the controller may monitor various performance characteristics of its corresponding drive (e.g., power consumption, temperature, response time/latency, or the like) to provide comprehensive storage drive analytics and diagnostics at the individual drive level. This type of monitoring can allow a controller to identify that its corresponding drive may be about to fail (e.g., changes in power consumption, temperatures above a threshold, increased latency, or the like), and coordinate with other controllers (or an administrator) to backup the potentially failing drive's data, halt future write operations to potentially failing drive, or the like.

In various embodiments, instead of a second connector providing a wired connection for communication to a backplane and the Ethernet switch fabric, the controller may instead provide wireless communication with one or more radio adapters located in a wireless multi-storage-drive chassis. In various embodiments, the wireless controller may include one or more wireless interfaces with antennas that enable communication with one or more radio adapters and/or one or more wireless controllers located in a wireless multi-storage-drive chassis. The wireless interfaces may be removed and exchanged and/or reprogrammed to accommodate at least a wireless communication protocol employed by a corresponding radio adapter. The wireless controller may be configured to wirelessly communicate through a channel in a waveguide, and/or outside of a waveguide, with one or more other wireless controllers and/or one or more other radio adapters. The wireless controller may include one or more antennas for wirelessly communicating. Also, the wireless controller may include a connector for receiving power from a wireless multi-storage-drive chassis. In various embodiments, the wireless controller enables communication between the chassis' storage devices and one or more radio adapters over a high bandwidth wireless connection, e.g., a WiFi 802.11 ad.

It should be noted that these examples of controller functionality are for illustration purposes and should not be construed as limiting, and that each controller may perform additional tasks and/or actions at the individual storage drive level and/or coordinate with each other to perform tasks and/or actions across a plurality of storage drives.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to a controller that provides individual network accessibility to a storage drive and provides individual control and management of the storage drive, while maintaining a form factor that is compatible with a typical multi-storage-drive chassis. In various embodiments, the controller (also referred to as a controller computer) may include at least a first connector, a second connector, a memory device, and a processor device. In various embodiments, a physical shape of the controller may be operative to fit adjacent to the storage drive connector and occupy less space than is bounded by peripheral edges of an end of a separate housing of the storage drive coupled to the storage drive connector.

The first connector may be operative to be coupled with a storage-drive connector of a storage drive. In some embodiments, the first connector may be a SATA connector. The second connector may be operative to be coupled with a backplane connector of a multi-storage-drive chassis. In some embodiments, the second connector may be a SAS connector. In various embodiments, at least one of the first connector or the second connector may be removably coupled to the controller computer.

The processor device may be operative execute instructions stored by the memory device to at least communicate with at least one other controller to cooperatively manage operation of the storage drive and at least one other storage drive correspondingly coupled to the at least one other controller computer. In at least one of the various embodiments, at least one storage drive may be a different type than another type of the storage drive.

In some embodiments, the controller may convert at least a portion of communication received through the first connector from a storage-drive protocol into an Ethernet protocol for output through the second connector. In other embodiments, the controller may convert at least a portion of communication received through the second connector from the Ethernet protocol into the storage-drive protocol for output through the first connector. In some embodiments, the controller computer enables the storage drive to be network addressable independent and separate from other storage drives.

In various embodiments, the controller may be operative to communicate—independent of a multi-storage-drive-chassis controller—with the at least one other controller to manage power-up sequences of the storage drive and the at least one other storage drive correspondingly coupled with the at least one other controller. In some embodiments, the controller may controller a power-up sequence of its correspondingly coupled storage drive. In some embodiments, the may determine a power supply of a multi-storage-drive chassis and at least one or more storage drive parameters of the storage drive. Based on the determined storage drive parameters and the determined power supply, the controller may determine at least one power-up sequence for the storage drive. The controller may employ one of the at least one power-up sequence that is optimal based on a request to access data on at least the storage drive.

In various other embodiments, the controller may be operative to communicate—independent of a multi-storage-drive-chassis controller—with the at least one other controller to manage distributed data storage and recovery between the storage drive and the at least one other storage drive correspondingly coupled with the at least one other controller.

In some embodiments, the controller may be operative to determine if the correspondingly coupled storage drive is potentially failing. In at least one embodiment, the controller may determine a profile of the storage drive, wherein the profile includes at least a history of at least one of power consumption, temperature, or latency of the storage drive. Based on a comparison of the profile to with other profiles of other storage drives, the controller may determine if the storage drive is exhibiting failure characteristics. In other embodiments, the controller may monitoring a performance of the storage drive and generate generating a profile for the storage drive based on the monitored performance. The controller may determine if the storage drive is potentially failing based on variations in the storage drive's profile as compared to profiles for the at least one other storage drive that is correspondingly coupled to the at least one other controller computer. In at least one embodiment, the controller may provide an alert regarding the determined potentially failing storage drive. In some other embodiments, the controller may provide alert and/or provide a request to backup the storage drive to an administrator of the storage drive, such as if the controller determines that the storage drive is potentially failing. In at least one of various embodiments, the controller may modifying an amount of power supplied to the storage drive, such as if it is determined to be potentially failing.

Illustrative Operating Environment

FIG. 1 shows components of one embodiment of an environment in which various embodiments of the invention may be practiced. Not all of the components may be required to practice the various embodiments, and variations in the arrangement and type of the components may be made without departing from the spirit or scope of the invention. As shown, system 100 of FIG. 1 may include multi-storage-drive chassis 110, network computers 102-105, and network 108.

Network computers 102-105 may communicate with multi-storage-drive chassis 110 via network 108. Network 108 may be configured to couple network computers with other computing devices, including network computers 102-105, multi-storage-drive chassis 110, other networks, or the like. In various embodiments, information communicated between devices may include various kinds of information, including, but not limited to, processor-readable instructions, client requests, server responses, program modules, applications, raw data, control data, video data, voice data, image data, text data, or the like. In some embodiments, this information may be communicated between devices using one or more technologies and/or network protocols.

In some embodiments, network 108 may include various wired networks, wireless networks, or any combination thereof. In various embodiments, network 108 may be enabled to employ various forms of communication technology, topology, computer-readable media, or the like, for communicating information from one electronic device to another. For example, network 108 can include—in addition to the Internet—LANs, WANs, Personal Area Networks (PANs), Campus Area Networks (CANs), Metropolitan Area Networks (MANs), direct communication connections (such as through a USB port), or the like, or any combination thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ any of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, network computers and/or other related electronic devices could be connected to a network via a modem and temporary telephone link. In essence, the network may include any communication technology by which information may travel between computing devices.

Network 108 may, in some embodiments, include various wireless networks, which may be configured to couple various portable network devices, remote computers, wired networks, other wireless networks, or the like. Wireless networks may include any of a variety of sub-networks that may further overlay stand-alone ad-hoc networks, or the like, to provide an infrastructure-oriented connection for at least network computers 103-105. Such sub-networks may include mesh networks, Wireless LAN (WLAN) networks, cellular networks, or the like. In at least one of the various embodiments, the system may include more than one wireless network.

Network 108 may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra wide band (UWB), Wireless Application Protocol (WAP), user datagram protocol (UDP), transmission control protocol/Internet protocol (TCP/IP), any portion of the Open Systems Interconnection (OSI) model protocols, session initiated protocol/real-time transport protocol (SIP/RTP), short message service (SMS), multimedia messaging service (MMS), or any of a variety of other communication protocols and/or technologies. In essence, the network may include communication technologies by which information may travel between network computers 102-105, multi-storage-drive 110, other computing devices not illustrated, other networks, or the like.

In various embodiments, at least a portion of the network may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self-organize based on current operating conditions and/or rule-based policies, such that the network topology of the network may be modified.

At least one embodiment of network computers 102-105 is described in more detail below in conjunction with network computer 200 of FIG. 2. Briefly, in some embodiments, network computers 102-105 may be configured to communicate with multi-storage-drive chassis 110 to enable distributed storage. In some embodiments, network computers 102-105 may communicate with individual controllers (e.g., controllers 114) for each storage drive associated with multi-storage-drive chassis 110 (e.g., storage drives 116) to perform reads and writes of data, access information and/or analytics, or the like. In various embodiments, network computers 102-105 may be remote and/or separate from chassis 110 and controllers 114.

In some embodiments, at least some of network computers 102-105 may operate over a wired and/or wireless network (e.g., network 108) to communicate with other computing devices and/or multi-storage-drive chassis 110. Generally, network computers 102-105 may include computing devices capable of communicating over a network to send and/or receive information, perform various online and/or offline activities, or the like. It should be recognized that embodiments described herein are not constrained by the number or type of network computers employed, and more or fewer network computers—and/or types of network computers—than what is illustrated in FIG. 1 may be employed.

Devices that may operate as network computers 102-105 may include various computing devices that typically connect to a network or other computing device using a wired and/or wireless communications medium. Network computers may include portable and/or non-portable computers. In some embodiments, network computers may include client computers, server computers, or the like. Examples of network computers 102-105 may include, but are not limited to, desktop computers (e.g., network computer 102), personal computers, multiprocessor systems, microprocessor-based or programmable electronic devices, network PCs, laptop computers (e.g., network computer 103), smart phones (e.g., network computer 104), tablet computers (e.g., network computer 105), cellular telephones, display pagers, radio frequency (RF) devices, infrared (IR) devices, Personal Digital Assistants (PDAs), handheld computers, wearable computing devices, entertainment/home media systems (e.g., televisions, gaming consoles, audio equipment, or the like), household devices (e.g., thermostats, refrigerators, home security systems, or the like), multimedia navigation systems, automotive communications and entertainment systems, integrated devices combining functionality of one or more of the preceding devices, or the like. As such, network computers 102-105 may include computers with a wide range of capabilities and features. In some embodiments, network computers 102-105 may be referred to as remote computers, because they access and/or store data on a different computer/device, such as multi-storage-drive chassis 110. In some embodiments, multi-storage-drive chassis 110 may be maintained at a location that is separate from network devices 102-105 (e.g., cloud computing/storage that utilize distributed storage systems).

Network computers 102-105 may access and/or employ various computing applications to enable users of network computers to perform various online and/or offline activities. Such activities may include, but are not limited to, generating documents, gathering/monitoring data, capturing/manipulating images, managing media, managing financial information, playing games, managing personal information, browsing the Internet, or the like. In some embodiments, network computers 102-105 may be enabled to connect to a network through a browser, or other web-based application.

Network computers 102-105 may further be configured to provide information that identifies the network computer. Such identifying information may include, but is not limited to, a type, capability, configuration, name, or the like, of the network computer. In at least one embodiment, a network computer may uniquely identify itself through any of a variety of mechanisms, such as an Internet Protocol (IP) address, phone number, Mobile Identification Number (MIN), media access control (MAC) address, electronic serial number (ESN), or other device identifier.

Multi-storage-drive chassis 110 may include backplane 112 and may be configured to house a plurality of separate storage drives, such as storage drives 116, which may include more or less devices than what is illustrated in the figure. In some embodiments, each storage drive may utilize (e.g., be fastened to) a storage carrier or tray (not shown) for insertion into the chassis. However, in some embodiments, the storage drives may be affixed directly to the chassis. As described herein, a separate controller (e.g., controllers 114) may be coupled to each separate storage drive and the combination of the storage drive and controller may be coupled to backplane 112. Each of controllers 114 may provide a separately addressable network interface for each of storage drives 116.

In various embodiments, chassis 110 may be configured and/or modified to provide Ethernet access to backplane 112. In at least one embodiment, backplane 112 may provide Ethernet access to each of controllers 114 through an Ethernet switch fabric interface that serially connects backplane connectors. In some embodiments, chassis 110 may include an Ethernet port and/or interface component for connecting chassis 110 to network 108.

Controllers 114 may directly communicate with network computers 102-105. In various embodiments, each of controllers 114 may convert data received from its corresponding storage drive 116 into an Ethernet protocol and communicated to network computers 102-105 via backplane 112 and network 108. Similarly, each controller may convert data received from network computers 102-105 (via network 108 and the Ethernet connection supported by backplane 112) into a storage drive protocol for accessing its own corresponding storage drive.

Since storage drives 116 can be of any typical/non-specific/general storage drive/agnostic, each of controllers 114 may perform different types of data protocol conversions depending on the type storage drive that it is coupled with. In this way, each storage drive can be individually addressable and network computers 102-105 can individually access each separate storage drive 116 via an Ethernet protocol without having to utilize a centralized/master controller—either a chassis controller or a standalone computer that centrally manages access to each storage drive 116. So, in various embodiment, each separate controller (of controllers 114), and thus each separate storage drive, is individually addressable and can be individually accessed by network devices 102-105.

In various embodiments, controllers 114 may communicate with each other via the Ethernet connection of backplane 112 to employ various storage drive management actions, monitoring actions, or the like. So in some embodiments, controllers 114 may communicate with each other—independent of a chassis controller or other primary/main/master/coordinator computer—to perform various actions (some of which may be done in parallel), including, but not limited to, data reads, data writes, data recovery, or the like.

For example, in some embodiments, the controllers may communicate with each other to perform distributed data storage actions among a plurality of storage drives. In one non-limiting example, network computer 102 may provide a write request to controller 118 (in some embodiments, this request may go through a load balancer or other routing device). Controller 118 may work together with the separate controllers 114 to coordinate the write request across one or more of storage drives 116 (even if the network computer is unaware of the other controllers and/or storage drives). In this example, controller 118 may coordinate with the other controllers of controllers 114 to determine which controller/storage drives will store what data. Since each controller 114 is network accessible (e.g., IP addressable), in some embodiments, network computer 102 may be able to individually access each storage drive 116 and indicate which storage drives will store what data.

Similarly, the controllers may communicate with each other to recover lost data. For example, assume there are 20 storage drives that are logically separated into four clusters, and each drive is coupled to a controller, as described herein. If one of the drives in a single cluster fails and the other drives in the same cluster are configured to and able rebuild the lost data of the failed drive, then the controllers associated with the drives in that cluster can coordinate the rebuild of the lost data, while the other 15 drives continue to perform data reads, writes, or the like.

In some other embodiments, controllers 114 may manage and coordinate power utilization of storage drives 116. In various embodiments, power consumption management and/or power management of a storage drive may include enabling and/or disabling various features of a storage drive. For example, a controller can manage the power consumption of its correspondingly coupled storage drive by providing different commands (e.g., through the command set) to the storage drive to enable/disable various features of the storage drive. In other embodiments, power management may include switching the power rails (e/g/. +3.3V, +5V and +12V) on and off.

In various embodiments, controllers 114 may communicate with each other to coordinate a schedule for powering up storage drives 116. In some embodiments, each controller 114 may be operative to determine parameters and/or capabilities of its corresponding storage drive. This determination may be based on a type of connector that is coupled to the storage drive (i.e., the first connector), previously stored power consumption profile of the storage drive, drive identifier, or the like.

Based on the parameters and/or capabilities of each storage drive in the chassis, controllers 114 may determine an efficient way of powering up the storage drives to reduce spikes in power consumption by the storage drives (i.e., each controller may determine various power-up sequences for its correspondingly coupled storage drive). In particular, mechanical drives (e.g., HDDs) may have an initial spike in power consumption when they turn on due to the electrical properties of powering up the motor to drive the disk. This power consumption can be compared to that of SSDs, which typically is a more step function when the drive is powered up.

Since each controller can manage the power supplied to its corresponding storage drive, and since there is no need for the drives to be of a uniform type (or model, or from a same manufacturer), the controllers as a group can determine and employ a power-up schedule that can allow one or more of the storage drives to power up before other storage drives are powered up. For example, in some embodiments, each of the mechanical drives (e.g., HDD) may be power up before the SSDs on the same chassis. Similarly, each the power up of each drive may be slightly staggered to further reduce the issues that can arise from a spike in power consumption. By optimizing the schedule for powering storage drives 116.

Similarly, a controller can individually and dynamically adjust the power of its corresponding drive at any given time. In this way, each controller can individually or collectively monitor the temperature of the various drives and adjust their power individually.

This type of drive-specific power control can enable a controller to reduce a drive's power—e.g., if the drive has a temperature above a threshold in an attempt to give the drive time to cool down. In other embodiments, a controller can increase or decrease the power supplied to its correspondingly coupled storage drive based on trade-offs between power consumption, speed of accessing data, regularity or frequency of access requests, or the like. In yet other embodiments, a plurality of controllers can coordinate to reduce power consumption on a per drive basis across a plurality of storage drives. So, in some embodiments, the controller may individually monitor and adjust the power supplied to an individual storage drive or may work collectively to manage/adjust the power supplied to the plurality of storage drives.

This type of control at the drive level can allow for reduced power consumption during various times of the day. For example, if some storage drives are idle for a predetermined time and the current time is at a peak price for energy (e.g., dollars per kilowatt used), then the controllers for those storage drives may individually reduce the power supplied to those storage drives—while other storage drives (that are accessed more recently) are maintained at a higher power. Therefore, a user of the chassis can save money on energy costs without greatly affecting performance.

Since each separate storage drive is managed by a separate controller, each controller can provide individualized management and/or monitoring of a corresponding storage drive. For example, in some embodiments, a controller can monitor power consumption, temperature, or other performance characteristics of the coupled storage drive and provide those monitored analytics to one of network computers 102-105 or to another controller. In at least one such embodiment, if a controller determines that its corresponding storage drive is operating at a temperature above a given threshold, the controller can reduce the power consumption of the drive or power it down completely (e.g., until the drive temperature falls below another threshold value).

In other embodiments, the controller may identify that its corresponding drive is exhibiting performance characteristics of a failing drive (e.g., extra power consumption, overheating, excessive latency (e.g., above a time threshold) while performing a read/write operation, or the like), then the controller can notify the other controllers (or one or more of network devices 102-105) that its drive may be about to fail. Once notified of the possible failure, the controllers can take steps to anticipate the failure. Such anticipation may include employing other controllers to write to other non-failing drives, initiate copying of the failing drive to a spare drive (that also has a corresponding controller), or the like.

In various other embodiments, the combined/coupled storage drive and controller may utilize hot swap features of chassis 110.

In some embodiments, controllers 114 may cooperatively coordinate with each other in a peer-to-peer architecture to control/manage operations of each correspondingly coupled storage drive 116, as described herein. In other embodiments, controllers 114 may cooperatively coordinate storage-drive-operation control/management with each other as more of a server-to-peer architecture, where one of controllers 114 may operate as a master controller and one or more of the other controllers of controllers 114 may operate as slave controllers.

In at least one such architecture, the slave controllers may provide information (e.g., storage-drive characteristics, performance parameters, or the like) to the master controller. The master controller can determine storage-drive power-up sequences and/or schedules, identify potentially failing storage drives, coordinate backup and/or recovery of a potentially failing (or already failed) storage drive, or the like, as described herein. Based on these determinations, the master controller may provide instructions to one or more of the slave controllers for managing their correspondingly coupled storage drives. For example, the master controller may provide separate instructions to each slave controller, which may separately indicate when and/or how a slave controller is to power-up its correspondingly coupled storage drive (noting that the master controller may also have a correspondingly coupled storage drive that may be managed/controlled in conjunctions with the other storage drives). In other embodiments, the controllers may communicate information amongst each other without directly accessing, managing, or otherwise controlling the storage drives.

In various other embodiments, a network computer (e.g., one of network computers 102-105, which may be remote to chassis 110) and controllers 114 may operate in a server-to-peer architecture to control/manage operations of one or more storage drives 116 in chassis 110 (or storage drives in multiple chassis)—similar to that which is described above. In at least one such embodiment, the network computer may operate as a master network computer and controllers 114 may operate as slave controllers. In various embodiments, the network computer (e.g., a master network computer) may coordinate and/or instruct each of controllers 114 (e.g., slave controllers) to control/manage operations of each correspondingly coupled storage drive 116. For example, controllers 114 may provide information (e.g., storage-drive characteristics, performance parameters, or the like) to the master network computer. The master network computer can determine storage-drive power-up sequences and/or schedules, identifying potentially failing storage drives, coordinate backup and/or recovery of a potentially failing (or already failed) storage drive, or the like, as described herein. Based on these determinations, the master network computer may provide instructions to one or more of controllers 114 for managing their correspondingly coupled storage drives. For example, the master network computer may provide separate instructions to each controller, which may separately indicate when and/or how a controller is to power-up a correspondingly coupled storage drive.

It should be noted that these architectures are not to be construed as exhaustive or limiting, but rather, other architectures may be employed in accordance with embodiments described herein. For example, in various embodiments, network computers 102-105 and/or controllers 114 may operate in various different architectures including, but not limited to, a peer-to-peer architecture, peer-to-server architecture, server-to-server architecture, or the like, to control/manage the operations of one or more of storage drives 116. As described herein, the control/management of storage-drive operations may include, but is not limited to determining storage-drive power-up sequences and/or schedules, identifying potentially failing storage drives, coordinate backup and/or recovery of a potentially failing (or already failed) storage drive, or the like.

Illustrative Network Computer

Figure 2:
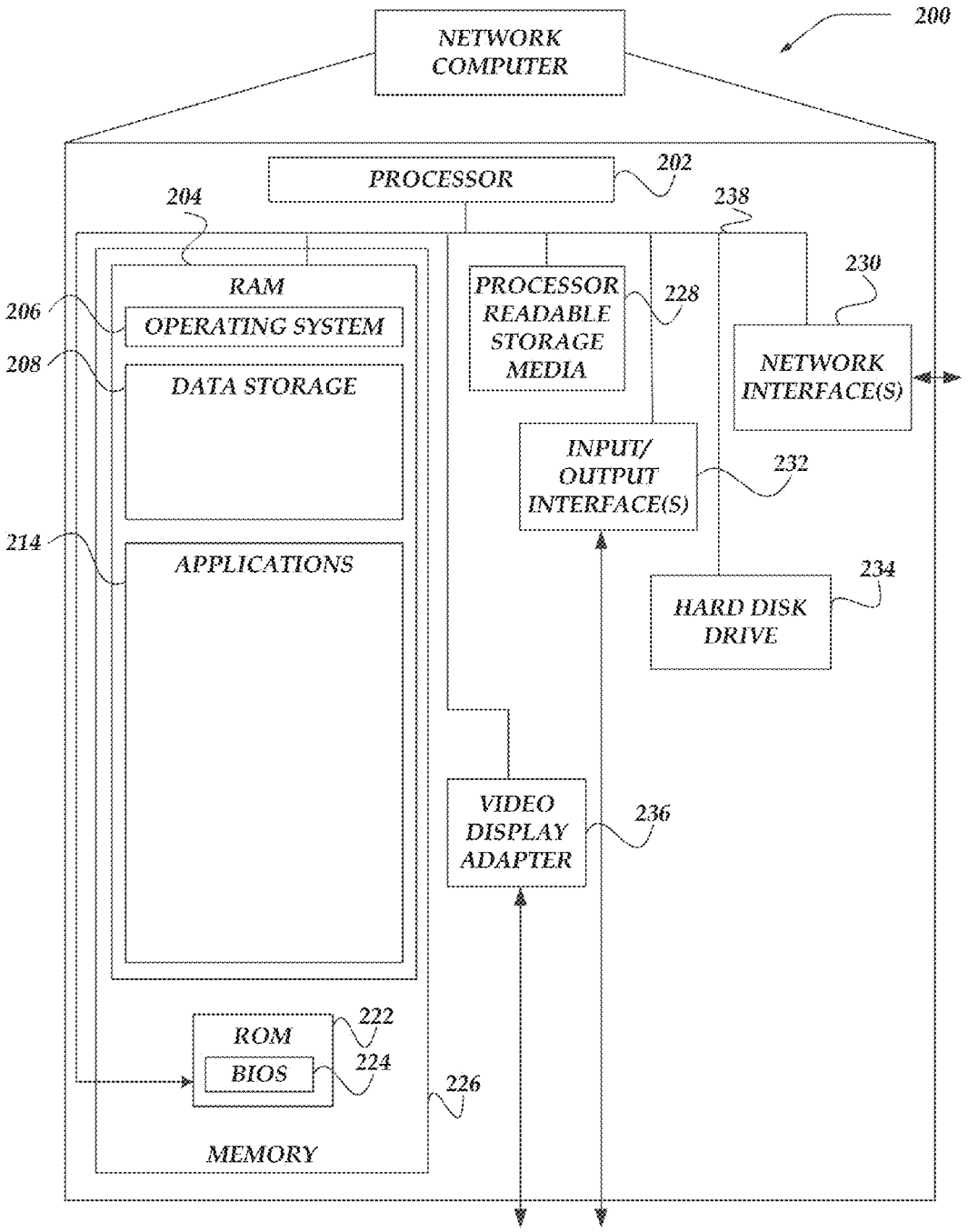
FIG. 2 shows an embodiment of a network computer that may be included in a system such as that shown in FIG. 1.

FIG. 2 shows one embodiment of a network computer 200 that may include many more or less components than those shown. The components shown, however, are sufficient to disclose an illustrative embodiment for practicing the invention. Network computer 200 may represent, for example network computers 102-105 of FIG. 1, and/or other network devices.

Network computer 200 may be configured to operate as a server, client, peer, a host, or other computing device. In general, network computer 200 may be a desktop computer, mobile computer (e.g., laptop computers, smart phones, tablets, or the like), server computer, or any other network computer that can communicate through a network to access and/or store data at a remote/secondary location (i.e., multi-storage-drive chassis 110 of FIG. 1).

Network computer 200 may include processor 202, processor readable storage media 228, network interface 230, an input/output interface 232, hard disk drive 234, video display adapter 236, and memory 226, all in communication with each other via bus 238. In some embodiments, processor 202 may include one or more central processing units.

Network interface 230 includes circuitry for coupling network computer 200 to one or more networks, and is constructed for use with one or more communication protocols and technologies including, but not limited to, protocols and technologies that implement any portion of the OSI model, GSM, CDMA, time division multiple access (TDMA), UDP, TCP/IP, SMS, MMS, GPRS, WAP, UWB, WiMax, SIP/RTP, EDGE, W-CDMA, LTE, UMTS, OFDM, CDMA2000, EVDO, HSDPA, or any of a variety of other wireless communication protocols. Network interface 230 is sometimes known as a transceiver, transceiving device, or network interface card (NIC). In various embodiments, network interface unit 230 may enable network computer 200 to access and/or store data on one or more storage drives associated with a multi-storage-drive chassis, such as multi-storage-drive chassis 110 of FIG. 1.

Network computer 200 may comprise input/output interface 232 for communicating with external devices, such as a keyboard, or other input or output devices not shown in FIG. 2. Input/output interface 232 can utilize one or more communication technologies, such as Universal Serial Bus (USB), infrared, WiFi, WiMax, Bluetooth™, wired technologies, or the like.

Memory 226 may include various types of storage technologies, which may include various types of non-volatile storage, volatile storage, or a combination thereof. Examples of memory 226 may include, but are not limited to Random Access Memory (RAM) (e.g., RAM 204), dynamic RAM (DRAM), static RAM (SRAM), Read-only Memory (ROM) (e.g., ROM 222), Electrically Erasable Programmable Read-only Memory (EEPROM), flash memory, hard disk drives, optical drives, magnetic computer storage devices, tape drives, floppy disk drives, or other processor-readable storage media. In some embodiments, memory 226 may include processor-readable transitory or non-transitory storage media. In various embodiments, memory 226 may include one or more caches.

Memory 226 may be utilized to store information, such as, but not limited to, processor-readable instructions (also referred to as computer-readable instructions), structured and/or unstructured data, program modules, or other data/information. In various embodiments, some of the data/information stored by memory 226 may be used by processor 202 to execute and/or perform actions. In some embodiments, at least some of the data/information stored by memory 226 may also be stored on another component of network computer 200, such as, but not limited to, process-readable storage media 228. Processor-readable storage media 228 may include one or more storage technologies, such as, but not limited to, those storage technologies described above for memory 226. In various embodiments, processor-readable storage media 228 may also be referred to as computer-readable storage media, processor-readable storage devices, and/or computer-readable storage devices. In some embodiments, process-readable storage media 228 may be removable or non-removable from network computer 200.

Memory 226 may include system firmware, such as BIOS 224, which may store instructions for controlling low-level operations of network computer 200. Memory 226 may also store operating system 206 for controlling the operation of network computer 200. In some embodiments, operating system 206 may include a general purpose operating system (e.g., UNIX, LINUX™, Windows™, OSX™, Windows Phone™, iOS™, Android™, or the like). The operating system functionality may be extended by one or more libraries, modules, plug-ins, or the like.

Memory 226 may include one or more data storage 208, which can be utilized by network computer 200 to store, among other things, applications 214 and/or other data. For example, data storage 208 may also be employed to store information that describes various capabilities of network computer 200. The information may then be provided to another device based on any of a variety of events, including being sent as part of a header during a communication, sent upon request, or the like. Data storage 208 may also include a database, text, spreadsheet, folder, file, or the like, that may be configured to maintain and store user account identifiers, user profiles, email addresses, IM addresses, and/or other network addresses; or the like. Data storage 208 may further include program code, data, algorithms, and the like, for use by a processor, such as processor 202 to execute and perform actions. In one embodiment, at least some of data store 208 might also be stored on another component of network computer 200, including, but not limited to processor-readable storage media 228, hard disk drive 234, or the like.

Applications 214 may include computer executable instructions that, when executed by network computer 200, transmit, receive, and/or otherwise process instructions and data. Examples of application programs may include, but are not limited to, calendars, search programs, email client applications, IM applications, SMS applications, contact managers, task managers, transcoders, schedulers, database programs, word processing programs, encryption applications, security applications, spreadsheet applications, games, and so forth.

A mobile computer may include a browser application that is configured to receive and to send web pages, web-based messages, graphics, text, multimedia, and the like. The mobile computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Applications 214 may also include an application that can enable a user to individually access each separate controller (e.g., controllers 114 of FIG. 1) associated with each storage drive (e.g., storage drives 116 of FIG. 1) through a network. So, in some embodiments, each controller (i.e., each storage drive) may be individually network addressable by network computer 200. This access can enable a user to employ control (e.g., power/voltage changes, temperature and other drive performance monitoring, or the like) over each individual drives within a multi-storage-drive chassis.

In various embodiments, network computer 200 may operate as a master network computer to cooperatively coordinate with at least one of controllers (e.g., controllers 114 of FIG. 1) to control/manage operations of one or more storage drives coupled to the controllers. In at least one such embodiment, network computer 200 may perform at least a portion of the operations described herein.

Illustrative Controller Computer

Figure 3A:
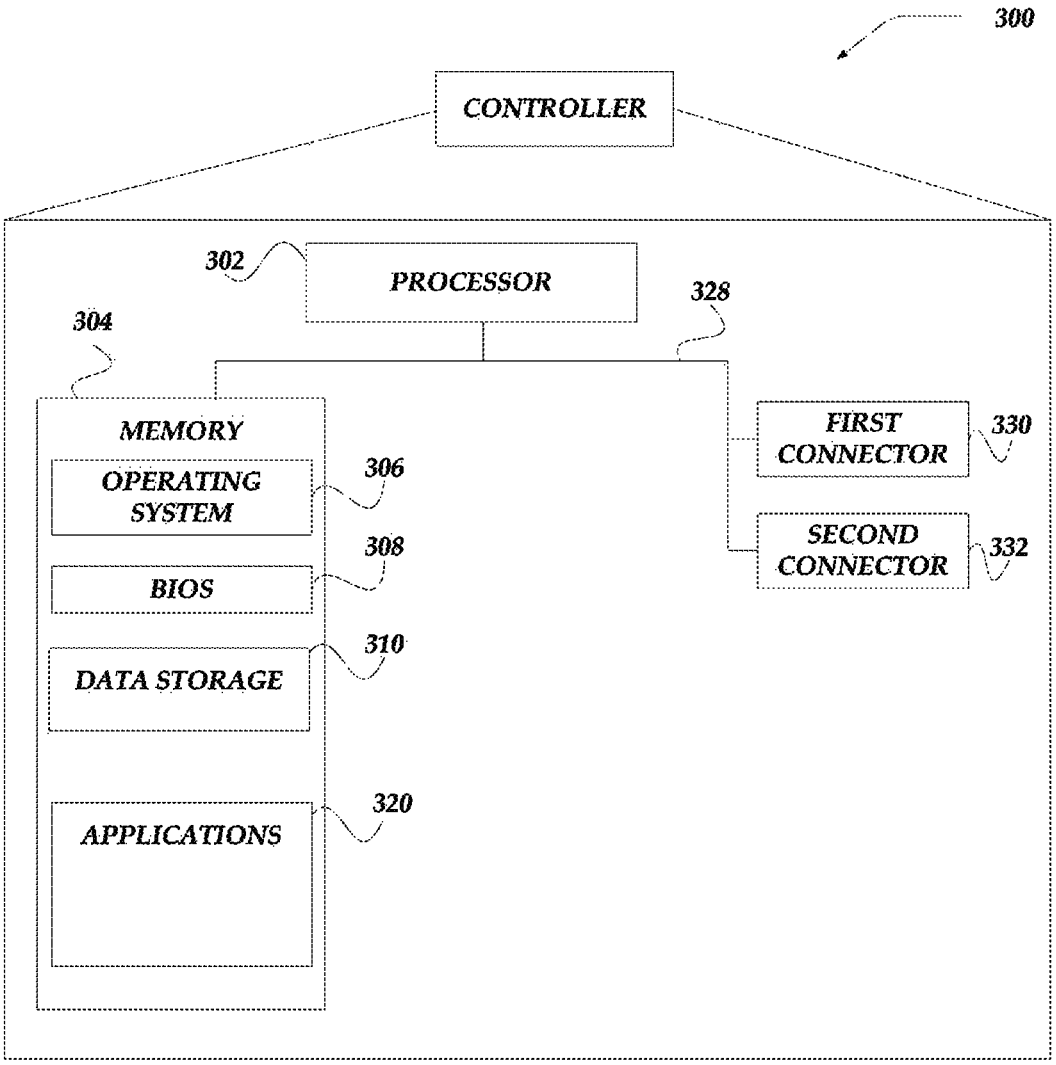
FIG. 3A-3B show embodiments of a controller that may be including in a system such as that shown in FIG. 1.

FIG. 3A shows one embodiment of a controller 300 that may include many more or less components than those shown. The components shown, however, are sufficient to disclose an illustrative embodiment for practicing the invention. Controller 300 may represent, for example controllers 114 of FIG. 1.

Controller 300 may be configured to enable individualized communication between a single storage drive (e.g., storage drives 116 of FIG. 1) and one or more network devices (e.g., network computers 102-105 of FIG. 1). It should be understood that although a single controller manages/controls a single storage drive, a plurality of controllers can work together to provide centralized management of a plurality of storage drives.

Controller 300 may include processor 302, first connector 330, second connector 332, and memory 304, all in communication with each other via bus 328. In some embodiments, processor 302 may include one or more central processing units. First connector 330 may be a connector configured to couple with and/or accept a storage-drive connector. In at least one embodiment, first connector 330 may be a SATA connector—although other storage-drive-compatible connectors may be utilized, as described herein. Second connector 332 may be a connector configured to couple with and/or be accepted by a backplane connector of a multi-storage-drive chassis. In at least one embodiment, second connector 332 may be a SAS connector—although other backplane-compatible connectors may be utilized, as described herein.

Memory 304 may include various types of storage technologies, which may include various types of non-volatile storage, volatile storage, or a combination thereof. Examples of memory 304 may include, but are not limited to Random Access Memory (RAM), dynamic RAM (DRAM), static RAM (SRAM), Read-only Memory (ROM), Electrically Erasable Programmable Read-only Memory (EEPROM), flash memory, or other processor-readable storage media. In some embodiments, memory 304 may include processor-readable transitory or non-transitory storage media. In various embodiments, memory 304 may include one or more caches.

Memory 304 may be utilized to store information, such as, but not limited to, processor-readable instructions (also referred to as computer-readable instructions), structured and/or unstructured data, program modules, or other data/information. In various embodiments, some of the data/information stored by memory 304 may be used by processor 302 to execute and/or perform actions.

Memory 304 may include system firmware, such as BIOS 308, which may store instructions for controlling low-level operations of controller 300. Memory 304 may also store operating system 306 for controlling the operation of controller 300. In some embodiments, operating system 306 may include a general purpose operating system (e.g., UNIX, LINUX™, or the like) or a customized operating system. The operating system functionality may be extended by one or more libraries, modules, plug-ins, or the like.

Memory 304 may include one or more data storage 310, which can be utilized by controller 300 to store, among other things, applications 320 and/or other data. Data storage 310 may further include program code, data, algorithms, and the like, for use by a processor, such as processor 302 to execute and Data storage 310 may be employed to store information associated with a storage drive that is connected to controller 300, such as, for example, a history of temperatures, voltages, utilization, or the like. Memory 304 may also be utilized to store network traffic information to enable communication with other devices, such as network computers 102-105 of FIG. 1 or other controllers (e.g., controllers 114 of FIG. 1). Applications 320 may include various applications for managing a storage drive, including, for example, power scheduling/management, diagnostic recording and assessment tools, or the like. In any event, controller 300 may be configured to employ various embodiments, combinations of embodiments, processes, or parts of processes, as described herein.

Figure 3B:
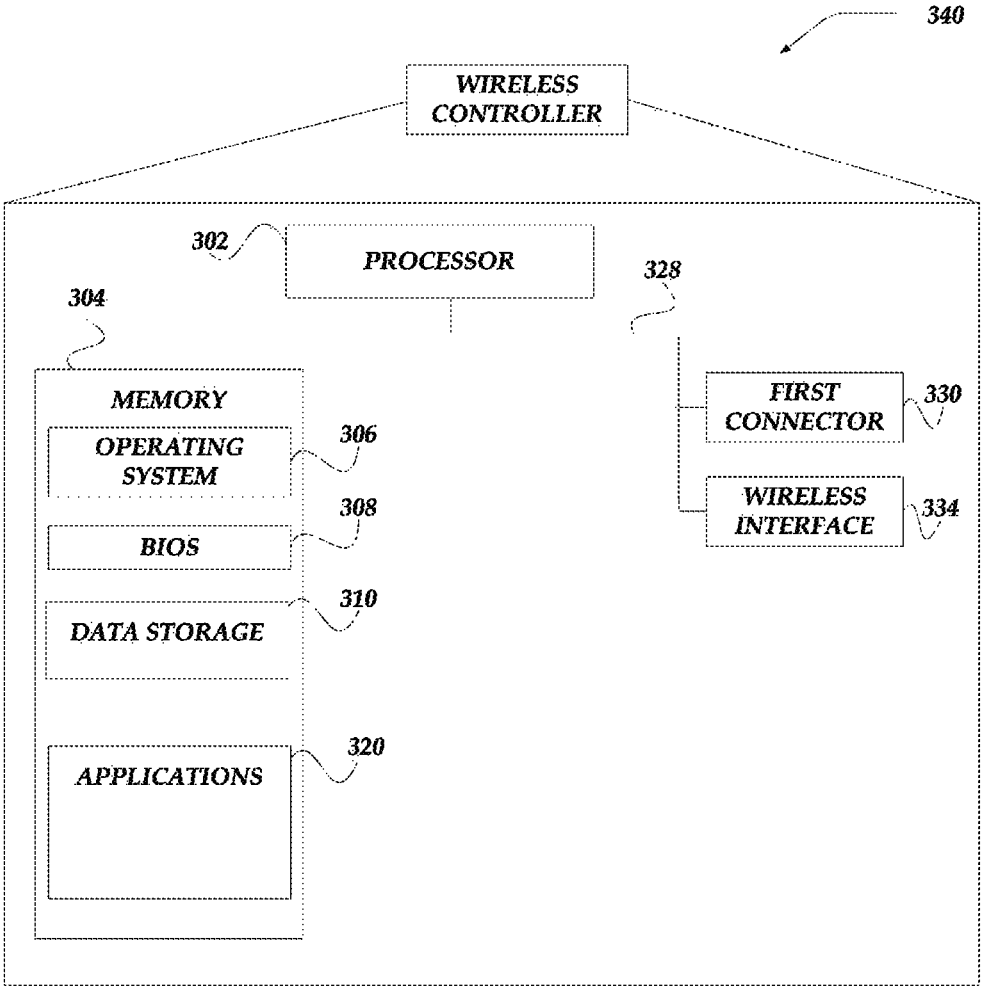

FIG. 3B shows one embodiment of wireless controller 340 that may include many more or less components than those shown. The components shown, however, are sufficient to disclose an illustrative embodiment for practicing the invention. Wireless controller 340 may represent, for example controllers 114 of FIG. 1.

Controller 340 may be configured to enable individualized communication between a single storage drive (e.g., storage drives 116 of FIG. 1) and one or more network devices (e.g., network computers 102-105 of FIG. 1). It should be understood that although a single controller manages/controls a single storage drive, a plurality of controllers can work together to provide centralized management of a plurality of storage drives.

Controller 340 may include processor 302, first connector 330, second connector 332, and memory 304, all in communication with each other via bus 328. In some embodiments, processor 302 may include one or more central processing units. First connector 330 may be a connector configured to couple with and/or accept a storage-drive connector. In at least one embodiment, first connector 330 may be a SATA connector—although other storage-drive-compatible connectors may be utilized, as described herein. Wireless interface 334 may include one or more antennas for communicating wireless signals with one or more other wireless controllers or one or more Radio Adapters. The wireless communication signals may be communicated with a standard wireless protocol, modified standard wireless protocol, and/or a proprietary wireless protocol.

Memory 304 may include various types of storage technologies, which may include various types of non-volatile storage, volatile storage, or a combination thereof. Examples of memory 304 may include, but are not limited to Random Access Memory (RAM), dynamic RAM (DRAM), static RAM (SRAM), Read-only Memory (ROM), (Electrically Erasable Programmable Read-only Memory (EEPROM), flash memory, or other processor-readable storage media. In some embodiments, memory 304 may include processor-readable transitory or non-transitory storage media. In various embodiments, memory 304 may include one or more caches.

Memory 304 may be utilized to store information, such as, but not limited to, processor-readable instructions (also referred to as computer-readable instructions), structured and/or unstructured data, program modules, or other data/information. In various embodiments, some of the data/information stored by memory 304 may be used by processor 302 to execute and/or perform actions.

Memory 304 may include system firmware, such as BIOS 308, which may store instructions for controlling low-level operations of controller 340. Memory 304 may also store operating system 306 for controlling the operation of controller 340. In some embodiments, operating system 306 may include a general purpose operating system (e.g., UNIX, LINUX™, or the like) or a customized operating system. The operating system functionality may be extended by one or more libraries, modules, plug-ins, or the like.

Memory 304 may include one or more data storage 310, which can be utilized by controller 300 to store, among other things, applications 320 and/or other data. Data storage 310 may further include program code, data, algorithms, and the like, for use by a processor, such as processor 302 to execute and Data storage 310 may be employed to store information associated with a storage drive that is connected to controller 340, such as, for example, a history of temperatures, voltages, utilization, or the like. Memory 304 may also be utilized to store network traffic information to enable communication with other devices, such as network computers 102-105 of FIG. 1 or other controllers (e.g., controllers 114 of FIG. 1). Applications 320 may include various applications for managing a storage drive, including, for example, power scheduling/management, diagnostic recording and assessment tools, or the like. In any event, controller 340 may be configured to employ various embodiments, combinations of embodiments, processes, or parts of processes, as described herein.

Illustrative Radio Adapter Computer

Figure 3C:
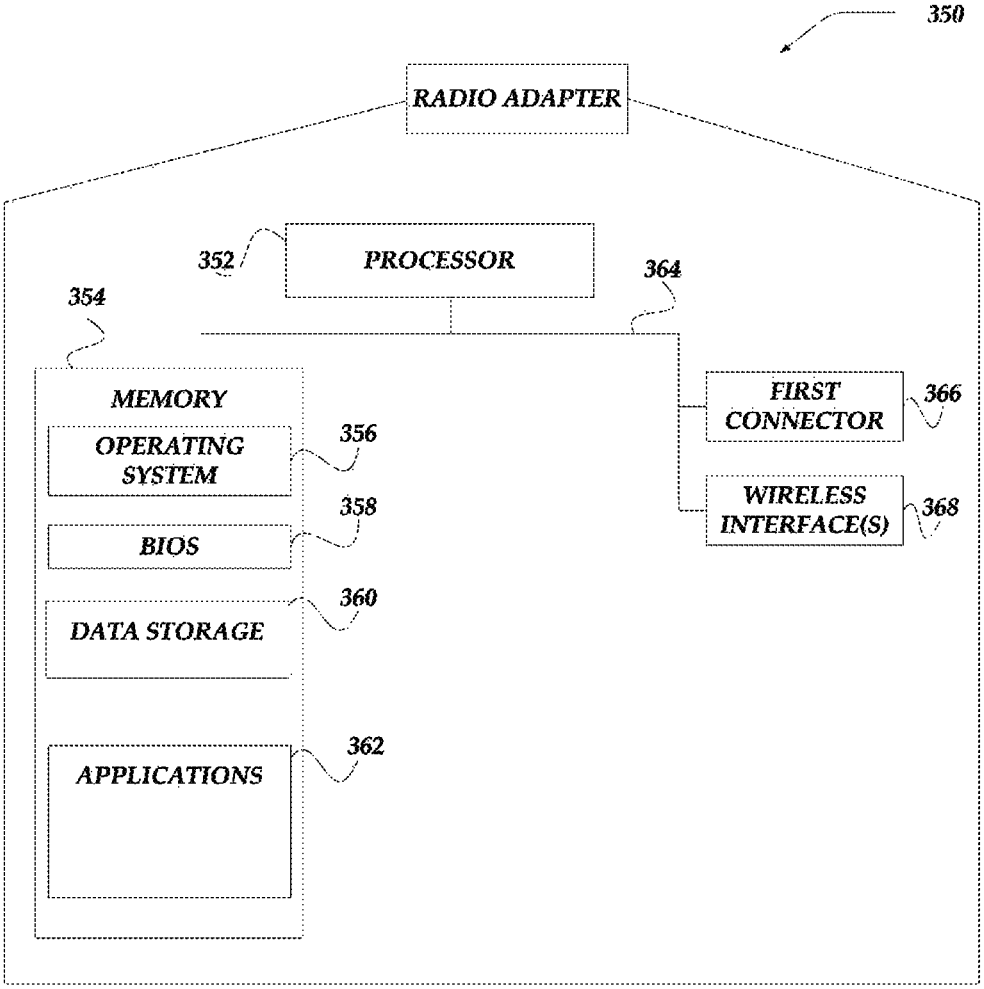
FIG. 3C shows an embodiment of a radio adapter.

FIG. 3C shows one embodiment of radio adapter 350 that may include many more or less components than those shown. The components shown, however, are sufficient to disclose an illustrative embodiment for practicing the invention. Radio Adapter 350 may represent, for example Radio Adapter 634 of FIG. 6B.

Radio Adapter 350 may be configured to enable individualized communication between wireless controller 340 and one or more network devices (e.g., network computers 102-105 of FIG. 1). It should be understood that although a single radio adapter may be employed, a plurality of radio adapters can work together to provide redundancy and flexible bandwidth to access a plurality of storage drives.

Controller 350 may include processor 352, first connector 366, wireless interface 368, and memory 354, all in communication with each other via bus 364. In some embodiments, processor 352 may include one or more central processing units. First connector 366 may be a connector configured to couple to a remote network via a high bandwidth connection. In at least one embodiment, first connector 366 may be a fiber optic connector—although other high bandwidth connectors may be utilized. Wireless interface 368 may include one or more antennas for communicating wireless signals with one or more wireless controllers and/or one or more other Radio Adapters. The wireless communication signals may be communicated with a standard wireless protocol, modified standard wireless protocol, and/or a proprietary wireless protocol.

Memory 354 may include various types of storage technologies, which may include various types of non-volatile storage, volatile storage, or a combination thereof. Examples of memory 354 may include, but are not limited to Random Access Memory (RAM), dynamic RAM (DRAM), static RAM (SRAM), Read-only Memory (ROM), Electrically Erasable Programmable Read-only Memory (EEPROM), flash memory, or other processor-readable storage media. In some embodiments, memory 354 may include processor-readable transitory or non-transitory storage media. In various embodiments, memory 354 may include one or more caches.

Memory 354 may be utilized to store information, such as, but not limited to, processor-readable instructions (also referred to as computer-readable instructions), structured and/or unstructured data, program modules, or other data/information. In various embodiments, some of the data/information stored by memory 354 may be used by processor 352 to execute and/or perform actions.

Memory 354 may include system firmware, such as BIOS 358, which may store instructions for controlling low-level operations of radio adapter 350. Memory 354 may also store operating system 356 for controlling the operation of radio adapter 350. In some embodiments, operating system 356 may include a general purpose operating system (e.g., UNIX, LINUX™, or the like) or a customized operating system. The operating system functionality may be extended by one or more libraries, modules, plug-ins, or the like.

Memory 354 may include one or more data storage 360, which can be utilized by controller 300 to store, among other things, applications 362 and/or other data. Data storage 360 may further include program code, data, algorithms, and the like, for use by a processor, such as processor 352 to execute and Data storage 360 may be employed to store information associated with accessing a network and/or a network device that is remote, managing communication with one or more wireless controllers, and managing communication with one or more other radio adapters. Memory 354 may also be utilized to store network traffic information to enable communication with other devices, such as network computers 102-105 of FIG. 1 or other radio adapters and wireless controllers. Applications 362 may include various applications for managing communication, or the like. In any event, radio adapter 350 may be configured to employ various embodiments, combinations of embodiments, processes, or parts of processes, as described herein.

General Operation

Figure 4B:
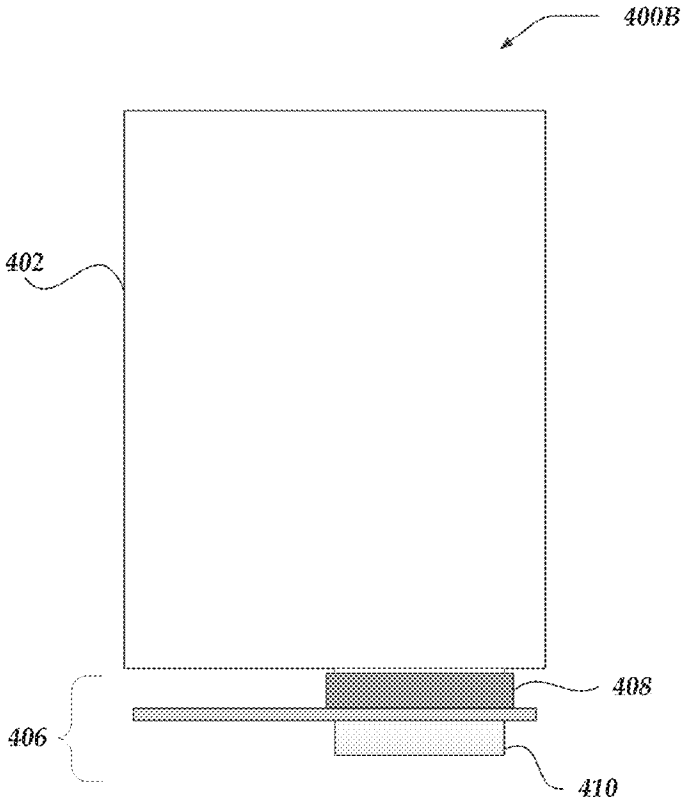
FIGS. 4A and 4B illustrate top perspective views of a storage drive and a controller in accordance with embodiments described herein.
Figure 4A:
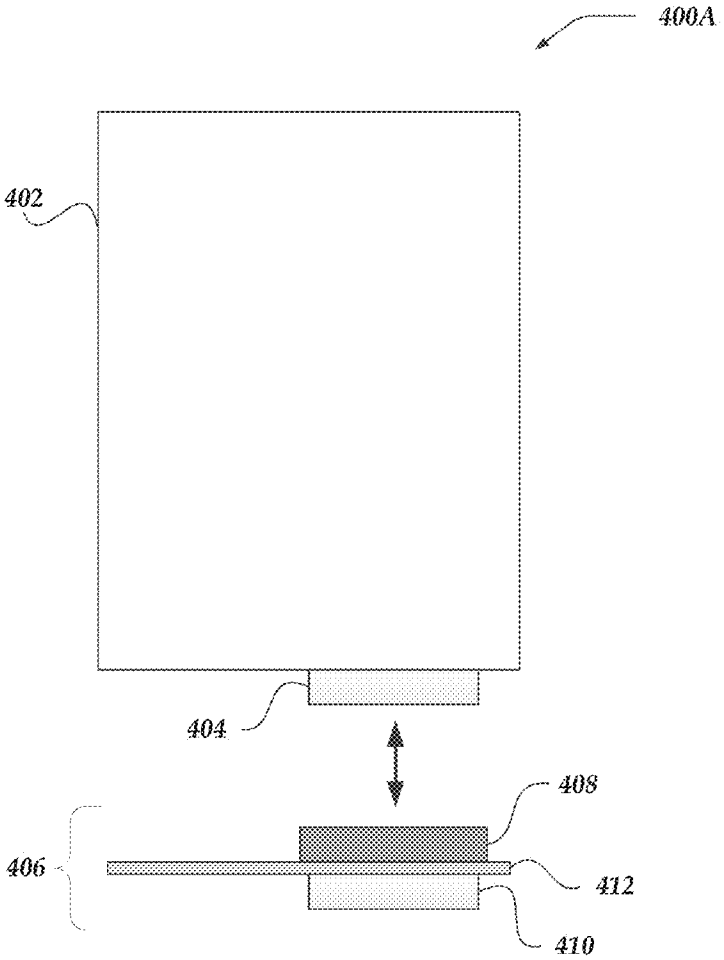

FIGS. 4A and 4B illustrate top perspective views of a storage drive and a controller in accordance with embodiments described herein. Example 400A may include storage drive 402 and a separate controller 406. In various embodiments, storage drive 402 may be any of a number of typical, generic, or non-specific storage drive (e.g., one of storage drives 116 of FIG. 1) that may be compatible with a multi-storage-drive chassis (e.g., multi-storage-drive chassis 110 of FIG. 1).

Storage drive 402 may be a hard disk drive, solid-state drive, optical drive, or other type of persistent (typically long-term) storage drives or devices. Storage drive 402 may include storage-drive connector 404. In various embodiments, storage-drive connector 404 may be a SATA connector or a SAS connector. Although embodiments herein are described primarily in terms of SATA or SAS compliant, other types of storage-drive connectors or interfaces, now known or later developed, may be employed, such as, but not limited to, USB, firewire (or IEEE 1394), thunderbolt, PATA connector, SCSI connector, Fibre Channel (FC) connector, EIDE connector, or the like.

Controller 406 may be an embodiment of controller 300 of FIG. 3. Controller 406 may include first connector 408, second connector 410, and circuit board 412. In various embodiments, the type of first and/or second connectors may be dependent on the type of connector of the storage drive and/or the type of connector on the backplane of the chassis. In some embodiments, first connector 408 may be a SATA connector, SAS connector, or other type of connector that is compatible with storage-drive connector 404. In other embodiments, second connector 410 may be a SAS, SATA connector, or other connector compatible with a backplane of a multi-storage-drive chassis.

First connector 408 may be connected to a first side of board 412, and second connector 410 may be connected to a second side of board 412 such that the connectors mirror each other. By mirroring each other, first connector 408 and second connector 410 may be directly lined up and on opposite sides of board 412. In various embodiments, each pin of first convector 408 may directly line up with a corresponding pin of second connector 410 (i.e., the pins of first connector 408 may mirror the pins of second connecter 410). This pin arrangement can enable controller 406 to be coupled with to storage drive 402 (e.g., as shown in FIG. 4B) such that second connector 410 acts as an extension of storage-drive connector 404. By having first connector 408 and second connector 410 lined up, the combined storage drive and controller can be used in combination in a typical drive carrier that can be insert into a multi-storage-drive chassis.

In some embodiments, controller 406 may be manufactured with first connector 408 and/or second connector 410 affixed to board 412. In other embodiments, controller 406 may be manufactured in a way that can enable a user to affix and/or remove first connector 408 and/or second connector 410 to/from board 412, which is described in more detail below in conjunction with FIG. 4F.

Board 412 may also include memory, processor, wires, and other circuitry that may be operative to perform various actions and functionality of controller 406, as described herein. For example, in some embodiments, controller 406 may perform or at least enable conversion of signals received through first connector 408 into an Ethernet compatible/supported signal that is output through second connector 410. Similarly, controller 406 may perform or at least enable conversion of signals received through second connector 410 into a storage-drive compatible format/protocol that is output through first connector 408.

In other embodiments, controller 406 may control accessibility of storage drive 402, control power up or down of storage drive 402, monitor various status performance or parameters (e.g., power consumption) of storage drive 402, communicate with other controllers that are connected to other storage drives (e.g., to enable collaboration of controllers to schedule power up procedures of the storage drives; generate and compare drive profiles to identify potentially failing or malfunctioning drives; recovery of lost data, such as from a 'dead' storage drive), or the like.

In various embodiments, board 412 may have dimensions that are smaller than that of a lateral cross section or fit into the shadow of storage drive 402, which is illustrated in FIG. 6 (i.e., the controller fits into the lateral-cross-section shadow of the storage-drive form factor).

FIG. 4B illustrates connector 406 coupled to storage drive 402. Example 400B may be an embodiment of example 400A of FIG. 4, but may illustrate controller 406 electrically coupled (or connected) to storage drive 402. In various embodiments, when coupled together, a front (and back) of board 412 may be substantially parallel to a back of storage drive 402. In some embodiments, the front of the board may refer to a side of the board with a majority of the circuitry and/or components. For example, the side with first connector 408 may be considered to be the front of board 412 of controller 406.

In various embodiments, controller 406 may be removable and separable from storage drive 402. In other embodiments, controller 406 may be fastened to storage drive 402, such as, for example, by a screw, connector clamp, or other attachment mechanism. In at least one such embodiment, an additional brace may be employed to fasten controller 406 to storage drive 402.

Since controller 406 may be a universal controller that can couple with a variety of different storage drives (e.g., different manufactures, types (e.g., HDD, SSD, or the like), form factors, connectors, or the like), controller 406 may be removed from a first storage drive and coupled to a second storage drive. The second storage drive may be a same or different model, made by a same or different manufacturer, have same or different capabilities/parameters, or the like, as the first storage drive, so long as both drives have storage-drive connectors (e.g., storage-drive connector 404) that are compatible with the first connector of the controller (e.g., first connector 408). However, embodiments are not so limited and in some embodiments, if the first storage drive and the second storage drive have different types of storage-drive connectors, then the first connector that is compatible with the first storage drive may be removed from the controller and a different first connector that is compatible with the second storage drive may be affixed to the controller. This universal interchangeability of the controller with different storage drives can enable a user to utilize most storage drives on the market (so long as the controller fits within the shadow of the storage drive form factor), without the need for extra hardware or software components built into the different storage drives or the chassis.

Figure 4C:
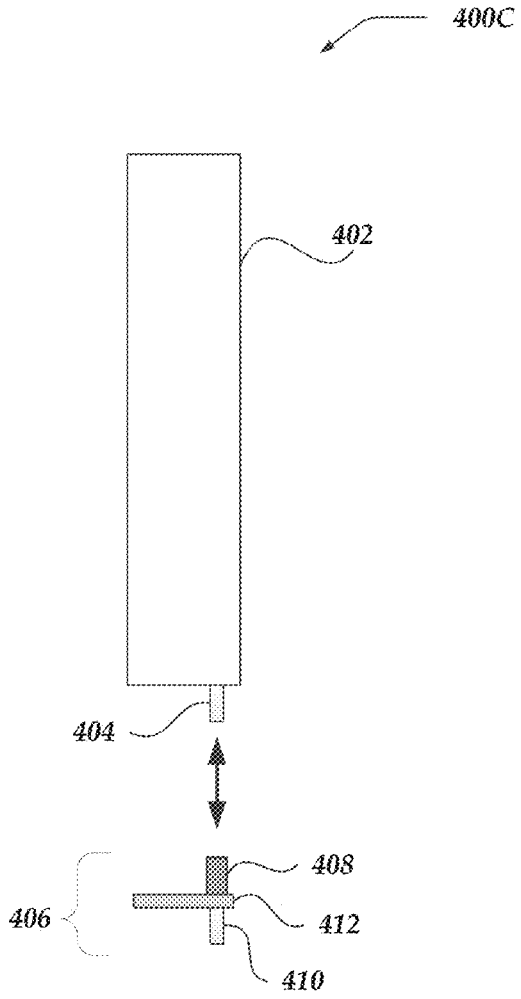
FIGS. 4C and 4D illustrate side perspective views of a storage drive and a controller in accordance with embodiments described herein.
Figure 4D:
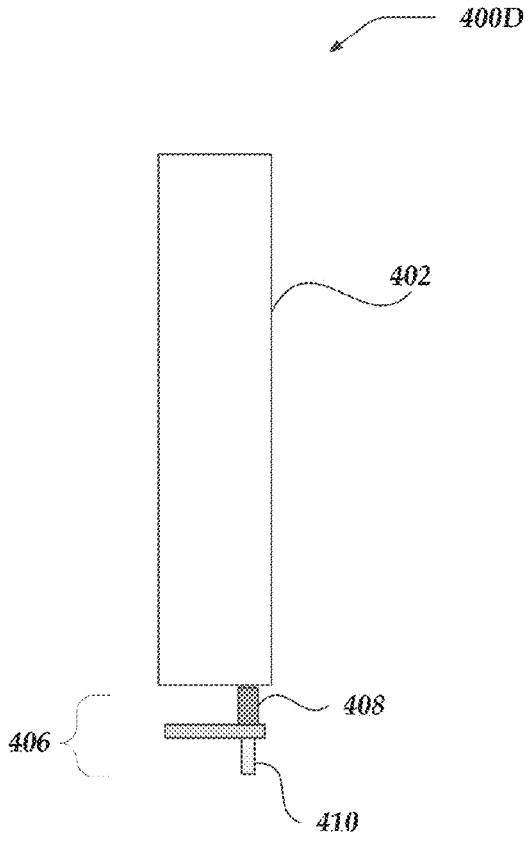

FIGS. 4C and 4D illustrate side perspective views of a storage drive and a controller in accordance with embodiments described herein. Example 400C may illustrate an embodiment of controller 406 separate from storage drive 402, similar to that of Example 400A. And example 400D may illustrate an embodiment of controller 406 coupled with storage drive 402, similar to that of Example 400B, but from a different perspective.

Figure 4E:
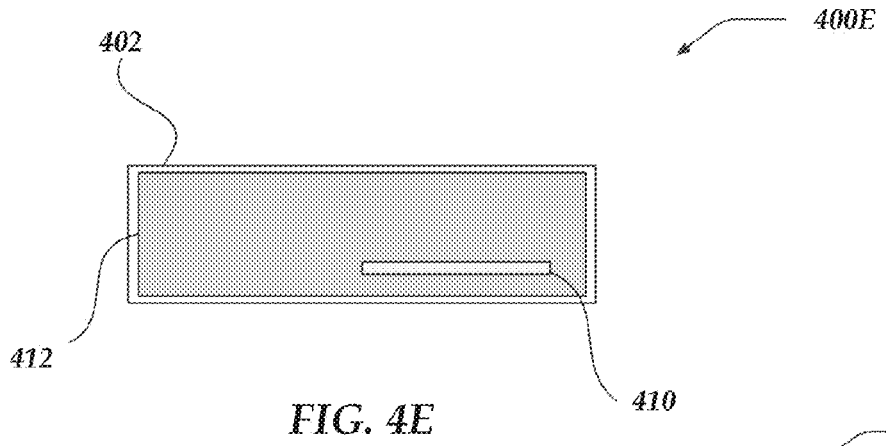
FIG. 4E illustrates a back perspective view of a storage drive and a controller in accordance with embodiments described herein.

FIG. 4E illustrates a back perspective view of a storage drive and a controller in accordance with embodiments described herein. As described herein, controller 406 (e.g., board 412) may have dimensions such that the perimeter of controller 406 (e.g., the perimeter of a front (and back) of board 412) is within the lateral, cross-section perimeter of storage drive 402, as illustrated. In some embodiments, a physical shape of the controller may be operative to fit adjacent to a correspondingly coupled storage drive connector and occupy less space than is bounded by peripheral edges of an end of a separate housing of a storage drive coupled to the storage drive connector (i.e., fitting into the form factor of the storage drive). By fitting into the form factor of the storage drive, the combined storage drive and controller to utilize a driver carrier for a typical multi-storage-drive chassis without modifications to the storage drive, drive carrier, and/or chassis.

Figure 4F:
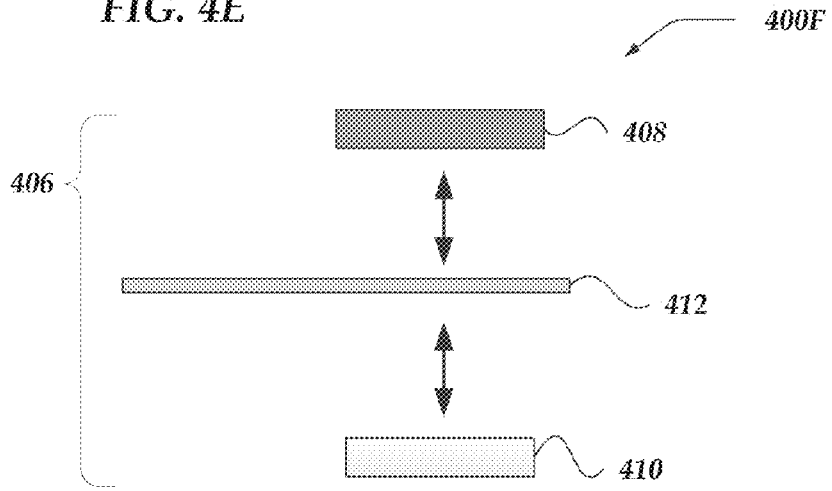
FIG. 4F illustrates a top perspective view of a controller in accordance with embodiments described herein.

FIG. 4F illustrates a top perspective view of a controller in accordance with embodiments described herein. As described above, controller 406 may be manufactured with first connector 408 and/or second connector 410 affixed to board 412, or may be manufactured in a way that can enable a user to affix and/or remove (and replace) first connector 408 and/or second connector 410 to/from board 412.

Figure 4G:
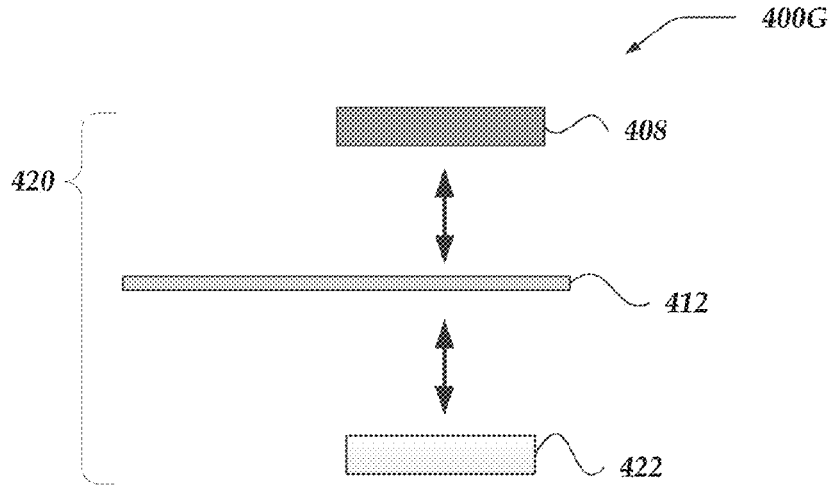
FIG. 4G shows a top perspective of a wireless controller.

FIG. 4G illustrates a top perspective view of exemplary embodiment 400G of wireless controller 420 in accordance with embodiments described herein. Wireless controller 420 may be manufactured with first connector 408 and wireless interface 422 affixed to board 412, or may be manufactured in a way that can enable a user to affix and/or remove (and replace) first connector 408 and/or wireless interface 422 to/from board 412. In various embodiments, different wireless interfaces may be installed on the board to accommodate various wireless communication protocols and/or antenna configurations.

In some embodiments, controller 406 and wireless controller 420 may be manufactured such that first connector 408, second connector 410, and/or wireless interface 422 are not removable from board 412. While in other embodiments, either controller may be manufactured such that at least one of the connectors can be removed. For example, in at least one embodiment, first connector 408, wireless interface 422, and/or second connector 410 may be bonded (e.g., soldered) to board 412 in a way that they cannot be removed without damaging the connectors or the controller. In another embodiment, first connector 408, wireless interface 422, and/or second connector 410 may share mounting holes so that circuit/electrical component mounting screws can be used to affix the connectors to the board, while maintaining the correct position of the connectors (i.e., opposite each other). In at least one such embodiment, a user may be enabled to remove the mounting screws and the corresponding connector from the board; and in other embodiments, the mounting screws may not be removable. Various other mounting mechanisms may also be employed, such as clamps, friction fit, brackets, or the like.

In various embodiments, a user may be enabled to affix first connector 408, wireless interface 422, and/or second connector 410 to board 412. For example, a user may be enabled to utilize component mounting screws, similar to what is described above, to affix and/or remove a connector from the board. These removable connectors may enable the board to be universal and compatible with different connectors, so that a user can mix and match connectors as necessary—depending on the storage-drive connector and backplane connector used.

In some embodiments, at least one of the connectors and/or wireless interface may be affixed to the board by a one-time-mounting mechanism. For example, a connector may include a mechanism such that when it is attached to the board (by either the manufacturer or a user), it cannot be removed from the board without destructive means. In at least one such embodiment, board 412 may include a mounting component (not illustrated) for affixing the connectors to the board. One such possible mounting mechanism may include a mounting component and connector that include opposing point and barb fasteners so that the points can pass next to each other upon coupling/affixing and the barbs engage each other to prevent removal.

It should be understood that these mounting-mechanism examples are for illustration purposes and should not be limiting. But rather, other mounting mechanisms may also be employed to mount, affix, or couple (either permanently or removably) first connector 408, wireless interface 422, and/or second connector 410 to board 412.

Figure 5B:
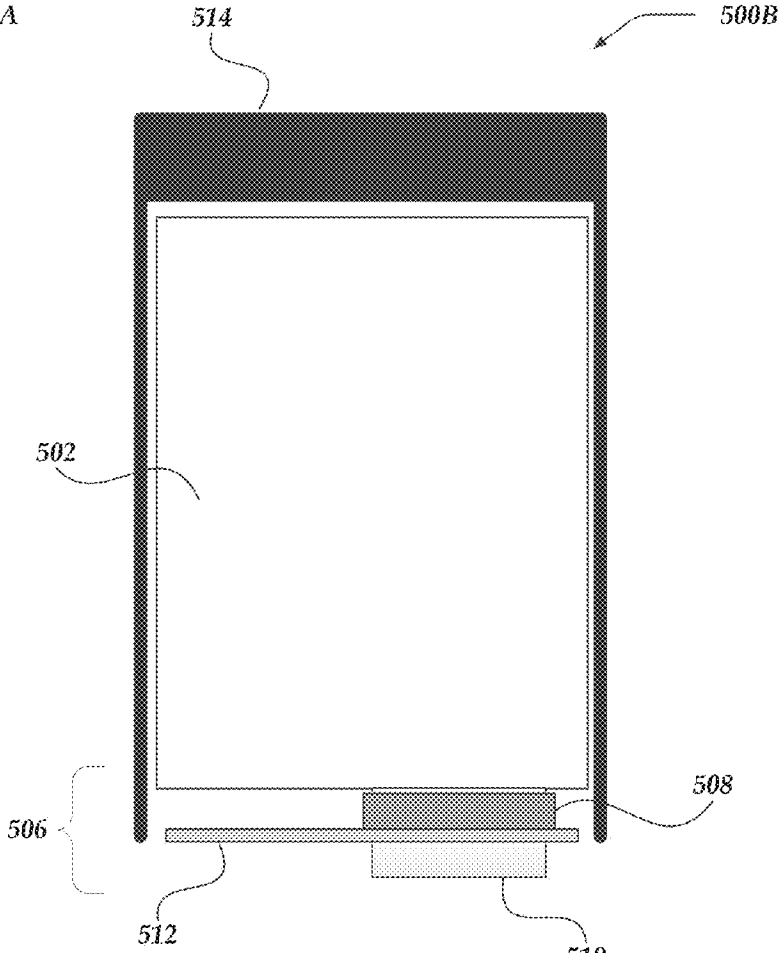
FIGS. 5A and 5B illustrate top perspective views of a storage-drive carrier, a storage drive, and a controller in accordance with embodiments described herein.
Figure 5A:
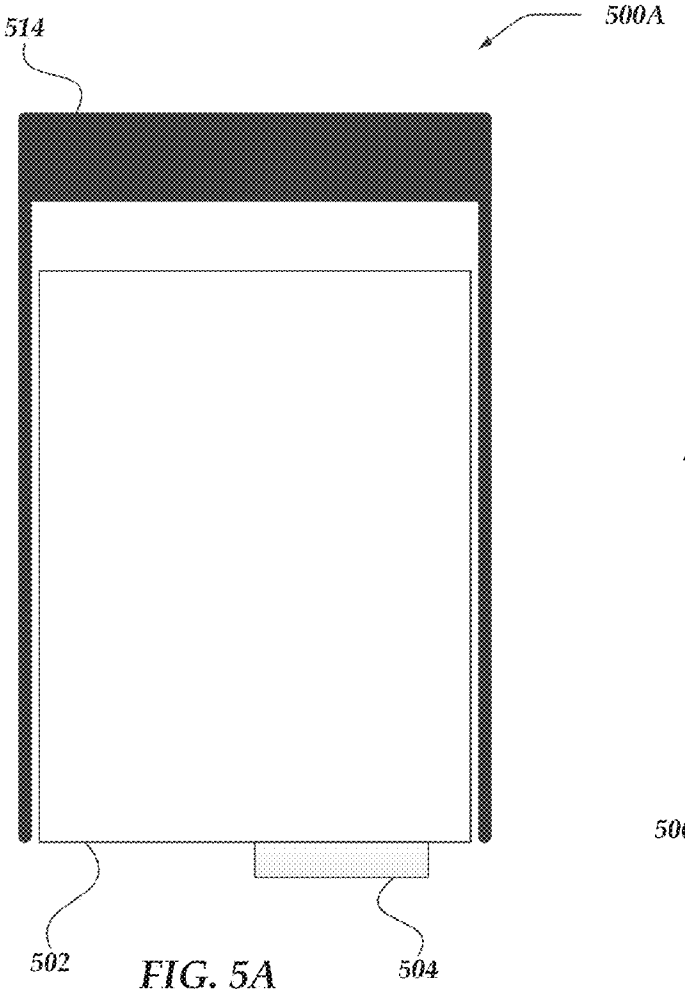

FIGS. 5A and 5B illustrate top perspective views of a storage-drive carrier, a storage drive, and a controller in accordance with embodiments described herein. Example 500A may include storage-drive carrier 514 and storage drive 502. Storage drive 502 may be an embodiment of storage drive 402 of FIGS. 4A-4F. As illustrated, storage-drive carrier 514 may be configured to hold/support storage drive 502, so that storage drive 502 can be easily inserted and removed from a multi-storage-drive chassis. It should be understood that the shapes and dimensions of storage-drive carrier 514 and storage drive 502 are for illustration purposes; and other shapes and/or dimensions of these devices may be utilized with the various embodiments described herein. Example 500B may be an embodiment of Example 500A, but illustrates controller 506 coupled with storage drive 502 (as described herein). In various embodiments, the combined controller and storage drive may physically fit into the form factor of the storage drive associated with the drive carrier—which can enable the drive carrier to be properly inserted into a chassis without the need for modifications to the chassis, drive carrier, or storage drive itself (although in some embodiments, an additional bracket may be utilize to fasten the controller to the storage drive and/or the storage-drive carrier).

Although primarily described herein as embodiments employing a multi-storage-drive chassis, embodiments are not so limited. Rather, in some embodiments, a single drive (or single-drive chassis) may be employed. For example, various embodiments, storage-drive carrier 514 may be a self-contained device that can operate independent of a chassis. For example, storage-drive carrier 514 may include a power supply (e.g., a power cord) and a RJ45 jack (or other Ethernet compatible jack). In at least one such embodiment, controller 506 may be built into carrier 514, but separate from storage drive 502. By employing embodiments described herein, this configuration can allow an individual consumer to turn any typical storage drive (e.g., from an old household-desktop computer) into a network addressable storage drive, without the need of an additional server computer.

Figure 6A:
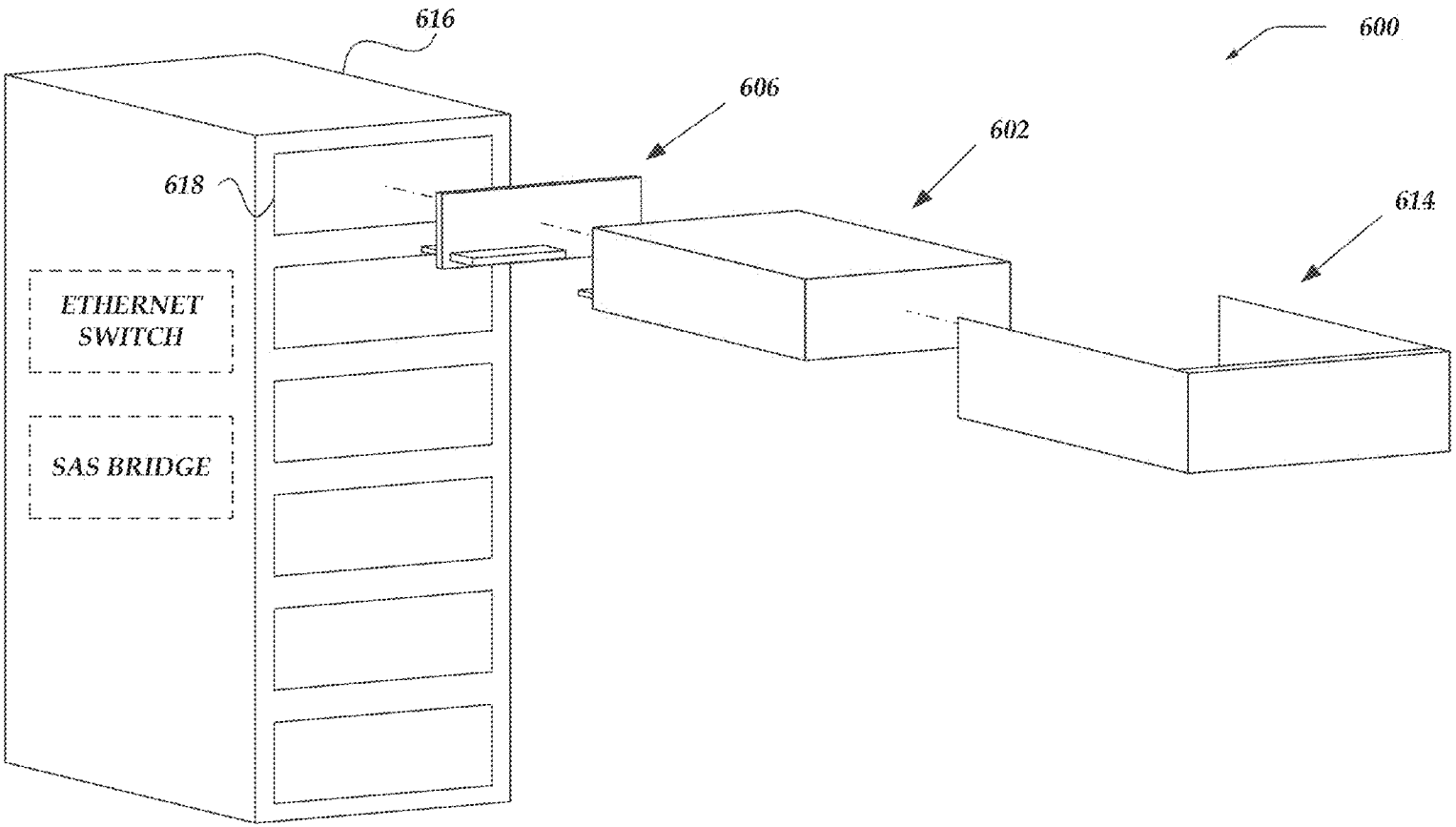
FIG. 6A illustrates an exploded perspective view of a multi-storage-drive chassis, a storage-drive carrier, a storage drive, and a controller in accordance with embodiments described herein.

FIG. 6A illustrates an exploded perspective view of a multi-storage-drive chassis, a storage-drive carrier, a storage drive, and a controller in accordance with embodiments described herein. System 600 may include multi-storage-drive chassis 616 and storage-drive carrier 614. Multi-storage drive chassis 616 may be an example of a JBOD or other chassis that can support a plurality of storage drives. In various embodiments, multi-storage-drive chassis 616 may include an Ethernet switch and a storage-drive-data bridge (e.g., a SAS bridge). In various embodiments, the Ethernet switch may provide access between controllers and/or from the chassis to other networks, and the storage-drive-data bridge may provide direct data access to a network computer without utilizing the Ethernet switch.

In some embodiments, storage-drive carrier 614 may be an embodiment of storage-drive carrier 514 of FIG. 5. Controller 606 may be embodiment of controller 406 of FIGS. 4A-4F. And storage drive 602 may be an embodiment of storage drive 402 of FIGS. 4A-4F. As illustrated, controller 606 may be coupled to a back of storage drive 602. This combination of devices may be fastened to storage drive carrier 614. The combined carrier 614, drive 602, and controller 606 may be inserted into slot 618 of chassis 616 in accordance with use instructions of chassis 616 for inserting a carrier into slot 618.

Figure 6B:
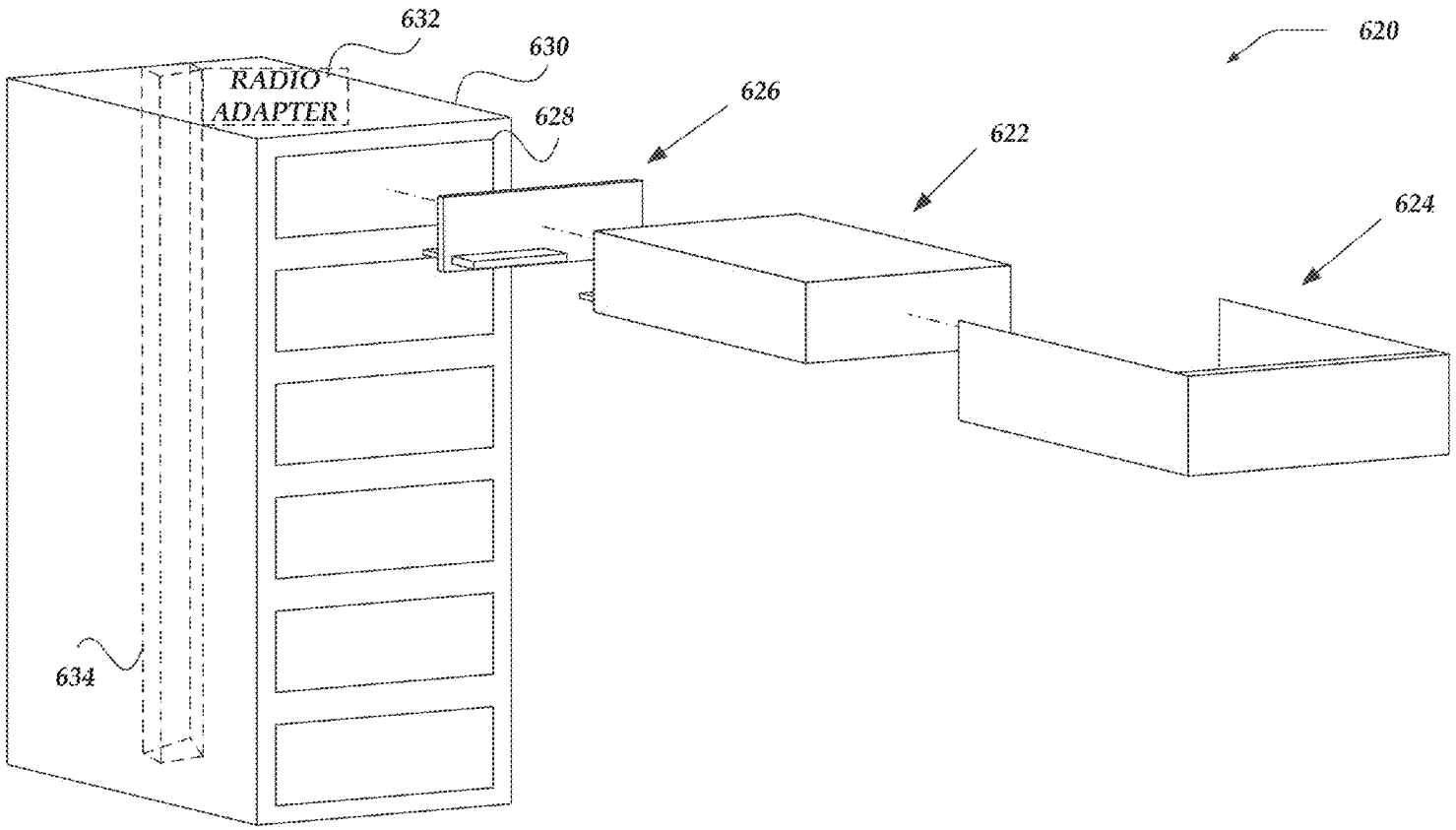
FIG. 6B shows an exploded perspective view of a multi-storage-drive chassis, a storage-drive carrier, a storage drive, a radio adapter, a waveguide, and a wireless controller in accordance with embodiments described herein.

FIG. 6B illustrates an exploded perspective view of a wireless multi-storage-drive chassis, a storage-drive carrier, a storage drive, and a controller in accordance with embodiments described herein. System 630 may include wireless multi-storage-drive chassis 630 and storage-drive carrier 624. Wireless multi-storage drive chassis 630 may be an example of a JBOD or other chassis that can support a plurality of storage drives. In various embodiments, multi-storage-drive chassis 630 may include one or more radio adapters 632 and waveguide 634. In various embodiments, the radio adapters may provide communication between wireless controllers and/or from the chassis to other networks.

In some embodiments, storage-drive carrier 624 may be an embodiment of storage-drive carrier 514 of FIG. 5. Wireless controller 626 may be embodiment of controller 420 of FIG. 4G. And storage drive 622 may be an embodiment of storage drive 402 of FIGS. 4A-4G. As illustrated, wireless controller 626 may be coupled to a back of storage drive 622. This combination of devices may be fastened to storage drive carrier 624. The combined carrier 624, drive 622, and wireless controller 626 may be inserted into slot 628 of chassis 630 in accordance with use instructions of chassis 630 for inserting a carrier into slot 628. Once inserted, wireless controller 626 may wirelessly communicate via a channel in waveguide 634 with radio adapter 632 and other wireless controllers and/or radio adapters coupled to waveguide 634.

Use Case Illustrations

Figure 7:
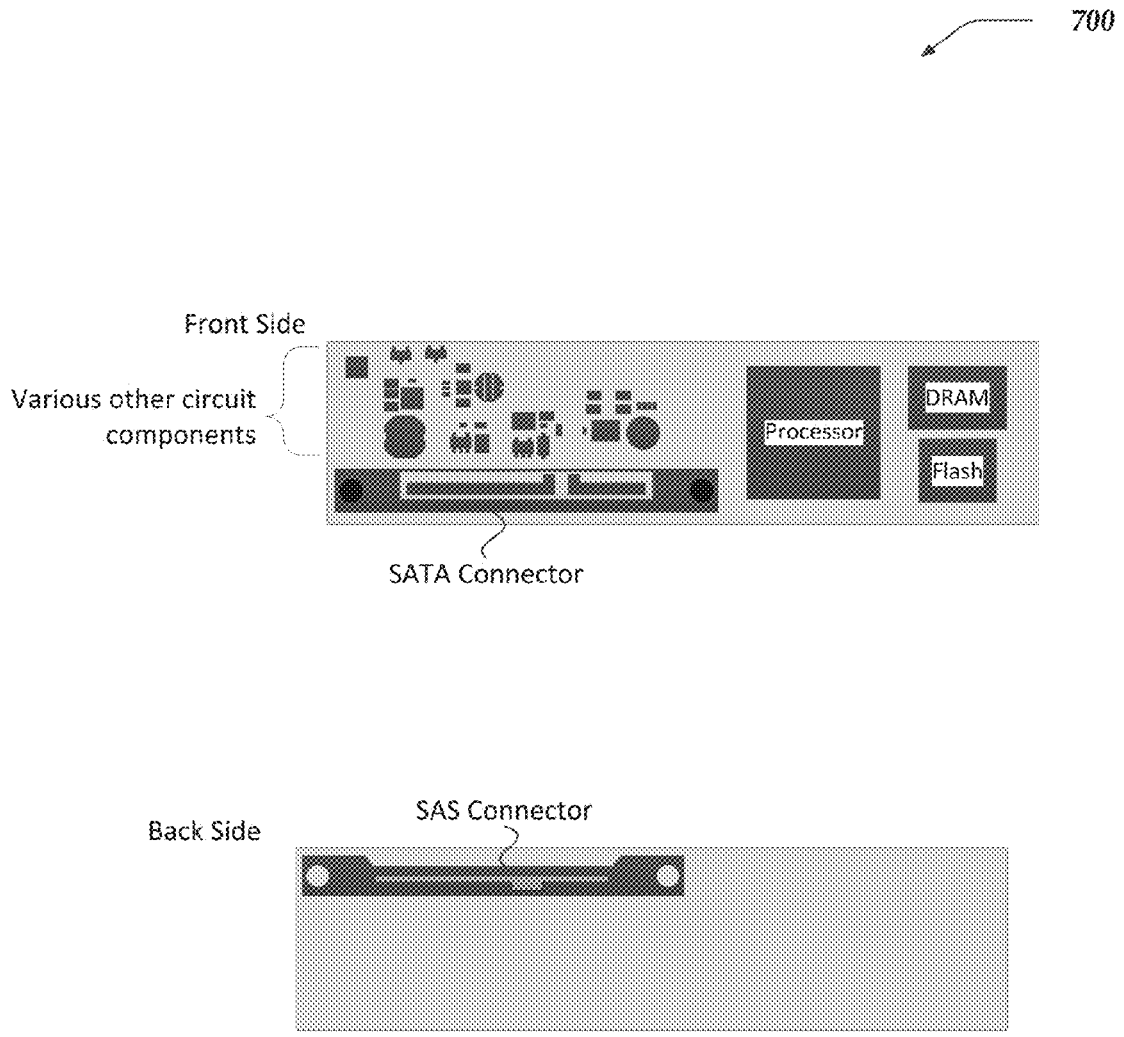
FIG. 7 illustrates an embodiment of a use case example of a controller circuit board with first and second connectors in accordance with embodiments described herein.

FIG. 7 illustrates an embodiment of a use case example of a controller circuit board with first and second connectors in accordance with embodiments described herein. Controller 700 may be an embodiment of controller 406 of FIG. 4. As illustrated, the front side of the controller board may include a processor DRAM, flash memory, SATA connector (i.e., first connector, such as first connector 408 of FIGS. 4A-4F) and various other circuit components, and the back side of the controller board may include a SAS connector (i.e., first connector, such as first connector 440 of FIGS. 4A-4F). The SATA connector may be the first connector for connecting the controller to a storage drive and the SAS connector may be the second connector for connecting to a backplane of a chassis. It should be understood that the SATA connector and the SAS connector be positioned so that a storage drive aligns with a backplane connector of a chassis.

Figure 8:
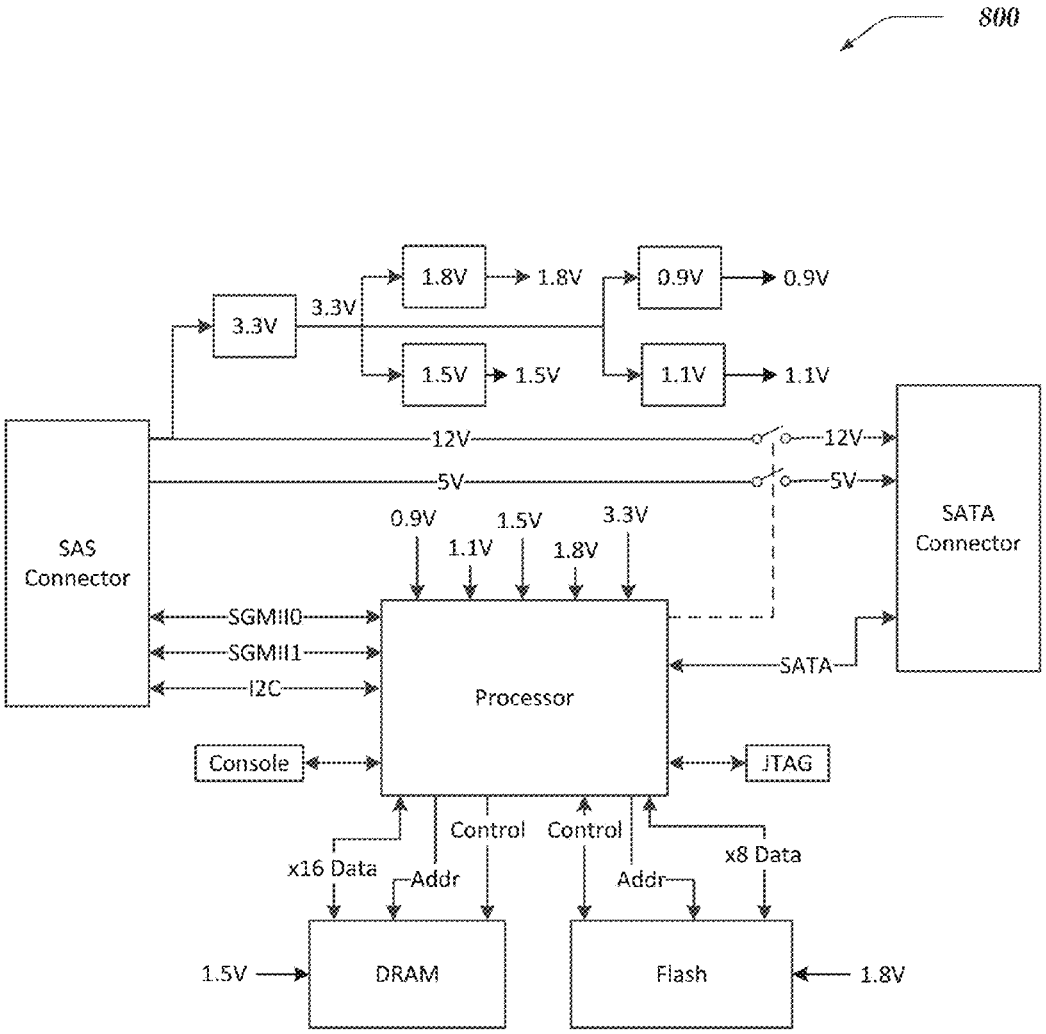
FIG. 8 illustrates an embodiment of a use case example of a system diagram of a controller in accordance with embodiments described herein.

FIG. 8 illustrates an embodiment of a use case example of a system diagram of a controller in accordance with embodiments described herein. Controller 800 may be an embodiment of controller 300 of FIG. 3. As illustrated, controller 800 may include a processor, SAS connector (i.e., second connector), SATA connector (i.e., first connector), DRAM, flash memory, and other components. As described herein, the processor may control the power received through the SAS connector (i.e., provided by a backplane that the SAS connector is coupled with) and provided to the SATA connector (i.e., to the storage drive. This power control can enable the controller to determine when the storage drive (that is connected to the SATA connector) is turned on (e.g., relative to other storage drives in a chassis), change the power provided to a storage drive (e.g., if the storage drive's temperature climbs over a threshold value), or the like.

The processor may communicate (e.g., send and receive data) with remote devices (e.g., other controllers, network computers, or the like) through at least one of two SGMII connections (illustrated by SGMII0 and SGMII1) utilizing the SAS connector. The processor may also communicate (e.g., send and receive data) with a storage drive through the SATA data lines utilizing the SATA connector. In various embodiments, the processor may convert data received through the SATA connector in a SATA compliant protocol (i.e., storage drive protocol) into a differential pair SGMII compliant protocol (i.e., an Ethernet protocol) for output through the SAS connector. Similarly, the processor may convert data received through the SAS connector in a differential pair SGMII compliant protocol (i.e., an Ethernet protocol) into a SATA compliant protocol (i.e., storage drive protocol) for output through the SATA connector.

Figure 9:
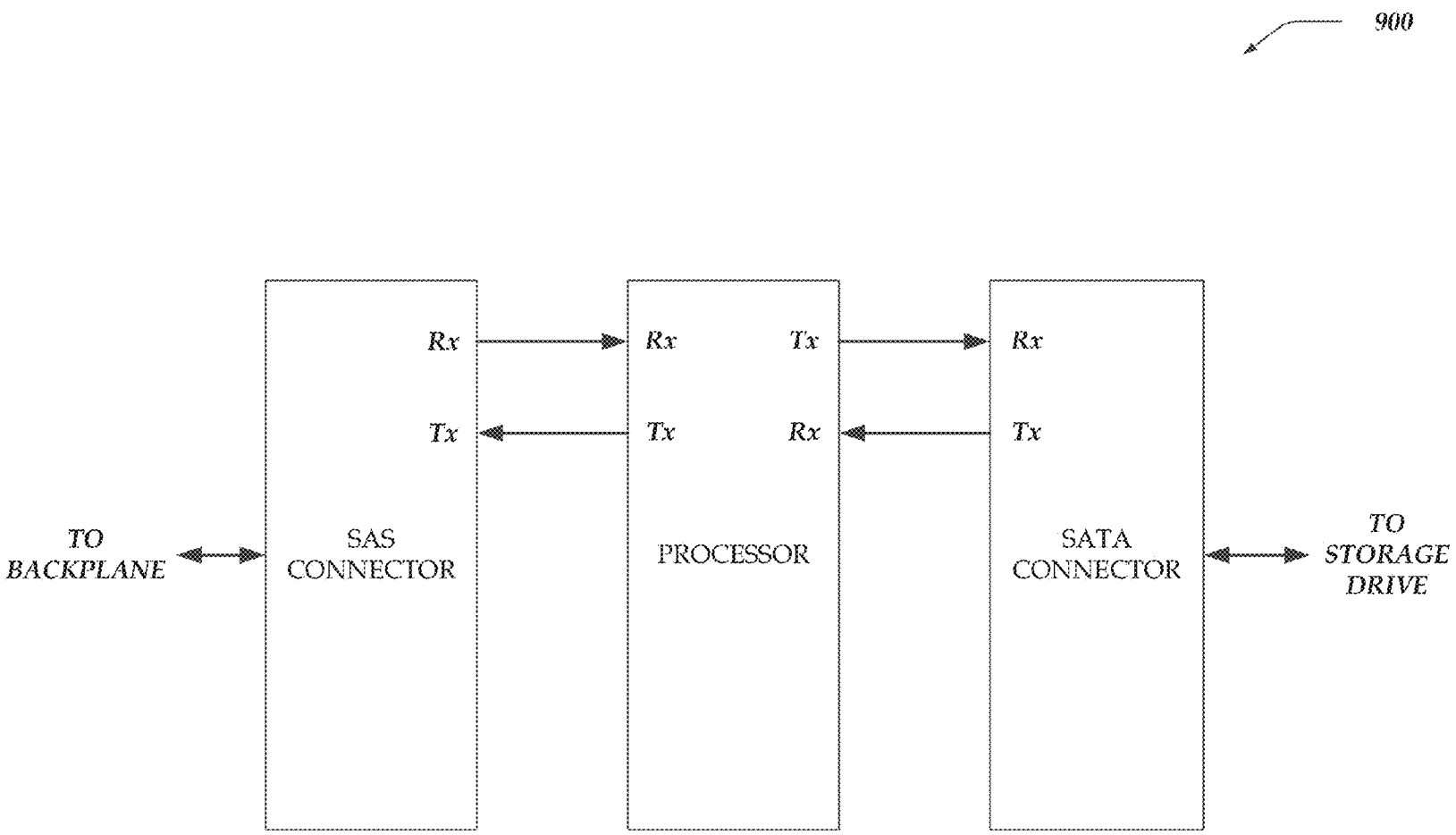
FIG. 9 illustrates an embodiment of a use case example diagram illustrating utilization of differential signal pairs in accordance with embodiments described herein.

In at least one of various embodiments, the same pins used on the SATA connector to transfer data in the SATA compliant protocol may be the same pins used on the SAS connector to transfer data in an SGMII compliant protocol. FIG. 9, described below, illustrates an embodiment for utilizing differential pair signaling between the processor and SAS connector (i.e., in an Ethernet protocol), and between the processor and SATA connector (i.e., in a storage drive protocol).

Also illustrated are various data lines between the processor and memory, as well as various power lines and circuitry for obtaining the proper voltages for use by the processor and other circuitry.

FIG. 9 illustrates an embodiment of a use case example diagram illustrating utilization of differential signal pairs in accordance with embodiments described herein. Controller 900 may be an embodiment of controller 800 of FIG. 8. For ease of illustration, only the processor, SAS connector (e.g., second connector 410 of FIGS. 4A-4F), and SATA connector (e.g., first connector 408 of FIGS. 4A-4F) are illustrated.

Briefly, the Rx receive pins of the SAS connector may be electrically coupled to a first set of Rx receive pins on the processor, and the Tx transmission pins of the SAS connector may be electrically coupled to a first set of Tx transmission pins on the processor. Additionally, the Rx receive pins of the SATA connector may be electrically couponed to a second set of Tx transmission pins on the processor, and the Tx transmission pins of the SATA connector may be electrically coupled to a second set of Rx receive pins on the processor.

In some embodiments, the data flow from the storage drive to the backplane (and then to another controller or network computer) may be as follows. Data may be received from the storage drive through the Tx transmission pins of the SATA connector. The processor may receive this data (or data signals) through the second set of Rx receive pins on the processor. The processor may perform any actions on the received data, such as convert the data from a SATA protocol into an Ethernet compliant protocol (e.g., differential Ethernet that utilizes IP packets). The processor may then output the converted data through the first set of Tx transmission pins on the processor. The converted data may be provided to the backplane through the Tx transmission pins of the SAS connector.

A component/interface on the backplane may then detect the presence of Ethernet frames on the Ethernet switch fabric and output them through an Ethernet port/interface to a remote network computer (or controller employed in a different chassis). In some embodiments, the controllers coupled to the backplane may communicate with each other by detecting the presence of the Ethernet frames on their interfaces with the Ethernet switch fabric of the chassis and inspecting them to determine if a response or action is needed. For example, a first controller may monitor the Ethernet frames on its interface (e.g., the backplane connector) with the Ethernet switch fabric of the chassis to determine if a second controller sent a message to the first controller.

In other embodiments, the data flow from the backplane to the storage drive may be as follows. In various embodiments, a component/Ethernet interface on the chassis may put Ethernet frames onto the Ethernet switch fabric interface for the controllers to detect, or another controller may put the Ethernet frames on the Ethernet switch fabric interface. Data may be received from the backplane through the Rx receive pins of the SAS connector. The processor may receive this data (or data signals) through the first set of Rx receive pins on the processor. The processor may perform any actions on the received data, such as convert the data from an Ethernet compliant protocol into a SATA compliant protocol for accessing the storage drive. The processor may then output the converted data through the second set of Tx transmission pins on the processor. The converted data may be provided to the storage drive through the Rx receive pins of the SATA connector. It should be noted that these data flows are for illustration purposes and other data paths may be employed depending on the connectors and/or processor utilized.

Illustrative Controller Functionality

Figure 10:
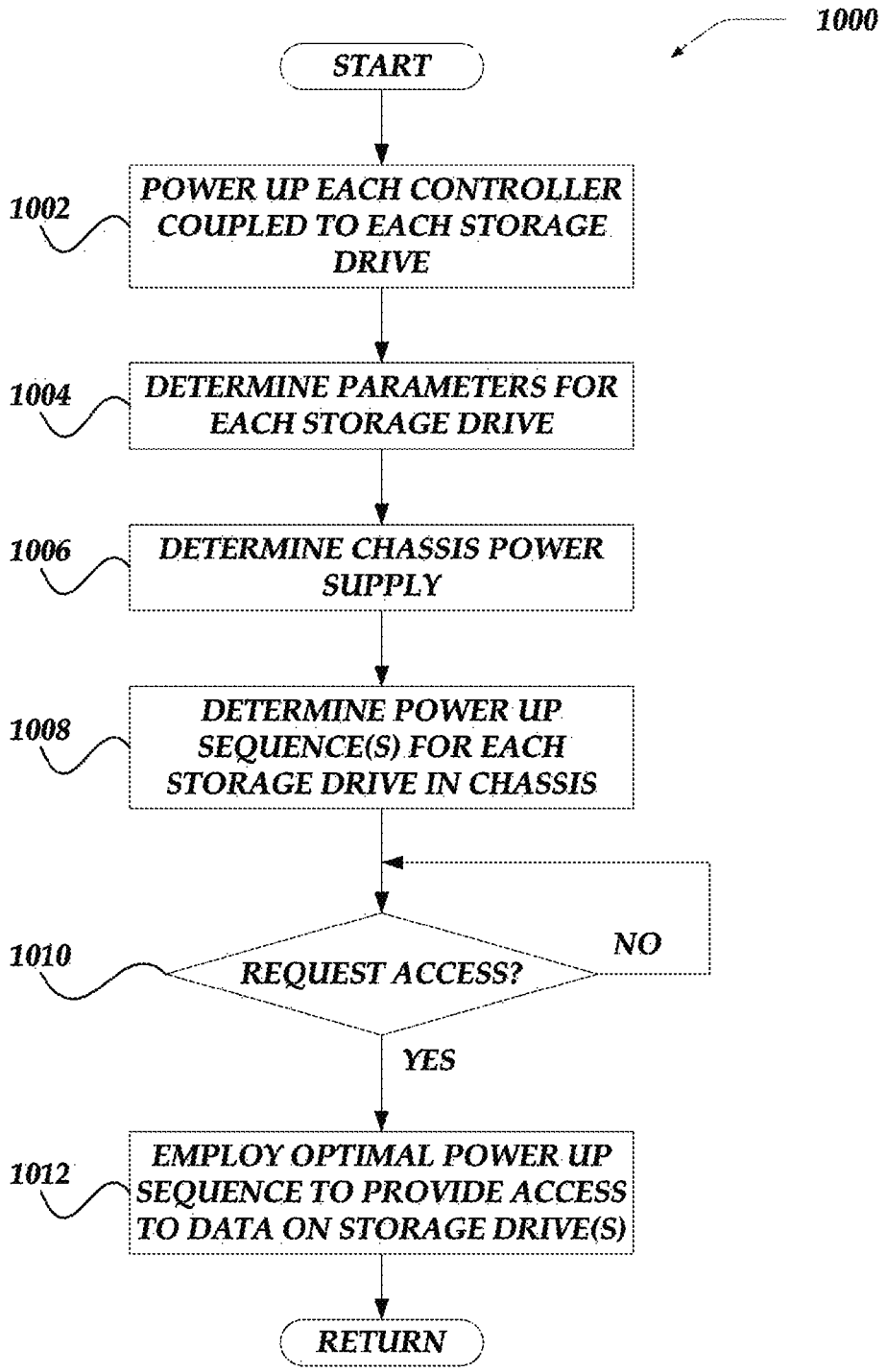
FIG. 10 illustrates a logical flow diagram generally showing an embodiment of a process for powering up a plurality of storage drives in accordance with embodiments described herein.

FIG. 10 illustrates a logical flow diagram generally showing an embodiment of a process for powering up a plurality of storage drives. Process 1000 may begin, after a start block, at block 1002, where each of a plurality of controllers may be powered up. As described herein, each controller (e.g., controller 406 of FIGS. 4A-4F) may be coupled to a separate storage drive of a plurality of storage drives. In various embodiments, the plurality of storage drives may be employed in a single chassis or across multiple chassis.

In some embodiments, when the chassis is powered up, each controller may turn on. In various embodiments, the watts required by a plurality of controllers may be substantially less than the watts required to turn on all of their corresponding storage drives. And in some embodiments, the total controller wattage may be comparable to the wattage utilized by a centralized chassis controller.

Process 1000 may proceed to block 1004, where—once powered up—each controller may separately and individually determine parameters of the corresponding storage drive that it is coupled with. For example, assume there is a first, second, third, and fourth controller coupled respectively to a first, second, third, and fourth storage drive. The first controller may determine the parameters of the first storage drive, the second controller may determine the parameters of the second storage drive, and so forth. The determined storage drive parameters may include, but are not limited to, a type of storage drive (e.g., a HDD, SSD, or the like), capabilities of the storage drive, how data is transmitted to the storage drive (e.g., a storage drive protocol), or the like.

In some embodiments, a plurality of controllers may coordinate with each other to determine the parameters of its correspondingly coupled storage drive. For example, in some embodiments, the controllers may take turns (e.g., each controller may perform actions separated from each other by a few millisecond (e.g., two milliseconds)) applying initial start-up power to its storage drive. By providing start-up power to a storage drive, the controller may communicate with the storage drive to obtain some of the parameters of the storage drive. These parameters may define the capabilities of the storage drive, power consumption profile of the storage drive, or the like.

A controller may determine these parameters based on the type of storage-drive connector (e.g., a SATA connector), a storage-drive identifier, previously stored power consumption data, other historical data regarding the storage drive (stored on the controller), or the like. In some embodiments, an administrator may provide the parameters of a storage drive to a correspondingly coupled controller.

Process 1000 may continue at block 1006, where at least one controller may determine the capabilities of the chassis power supply. In some embodiments, each controller may determine the chassis-power-supply capabilities, but in other embodiments, one controller may determine the chassis-power-supply chassis and provide that information to other controllers.

In various embodiments, the capabilities of the chassis power supply may include, but is not limited to, one or more voltages supplied by the backplane of the chassis. In some other embodiments, the at least one controller may also determine other parameters of the chassis and/or backplane. These other parameters may include, for example, how many storage drives can the chassis hold, how many other chassis are being powered, what is the overall load on the power supply, an Ethernet protocol supported by the chassis (e.g., as described in more detail below in conjunction with FIG. 11), or the like.

Process 1000 may proceed next to block 1008, where at least one power-up sequence may be determined for each storage drive in the chassis. In various embodiments, each controller may separately determine the power-up sequence(s) for its correspondingly coupled storage drive. In some embodiments, the power-up sequence(s) of a storage drive may be determined based on the parameters of that corresponding storage drive. Each separate power-up sequence can be optimized for different power-up scenarios and schedules, as described herein. In various embodiments, different power-up sequences may be for the different states of the storage drive, such as the initial power-up state, the initial read/write access state, or the like.

In some embodiments, one power-up sequence may be determined for a storage drive if only that storage drive is powered up or accessed, but not other storage drives. In at least one such embodiment, an example power-up sequence may be to fully power on the storage drive as soon as electrically possible (e.g., as soon as the controller receives an access request). In various embodiments, the power-up sequence of a storage drive may include an order for enabling various features of the storage drive (e.g., through the command set).

In other embodiments, one or more other power-up sequences may include ramping up the voltage provided to the storage drive over time, where each different sequence may include a different rate of ramping up the storage drive and/or variations in the ramp-up rate over time. For example, one sequence may be to power up the storage drive one volt per millisecond (i.e., increase the voltage to the storage drive by one volt per millisecond. In another example, another sequence may be to power up the storage drive to seven volts, wait two millisecond, and then increase the voltage to a full 12 volts. In various embodiments, the voltage supplied to the storage drive may be a step function (e.g., a ramp up and down may be trapezoidal in fashion), a linear increase, accelerating or decelerating increase, include multiple stages, include a wait time in between stages, or the like, or a combination thereof. It should be understood that these examples are for illustration and should not be construed as exhaustive or limiting.

In various embodiments, each of the plurality of controllers may communicate with each of the other controllers (e.g., via the Ethernet because each controller is IP addressable, as described herein) to determine and/or identify the other controllers of the plurality of controllers (as noted above, these controllers may be employed in a single chassis or in multiple chassis). In some embodiments, the controllers may send out various requests (e.g., via the backplane) to identify the other controllers.

Once identified, each controller can share their corresponding storage drive's power-up sequences and/or parameters with the other controllers. In some embodiments, the plurality of controllers may work together to determine a power-up schedule for at least a subset of the plurality of storage drives. In other embodiments, a single controller may determine the power-up schedule. In at least one such embodiment, the scheduling controller may receive the other storage drives' parameters from the other controllers (this may be performed locally to the chassis through the backplane without having to communicate to a master chassis controller or a remote master network computer). In various embodiments, the schedule may be for storage drives on a single chassis or for storage drive in a plurality of chassis.

In some embodiments, the schedule may be determined based on the parameters and/or the power-up sequence(s) (as previously determined by each separate controller) of each storage drive. In various embodiments, the schedule may be based on the scenario for powering-up one or more storage drives. Examples of different scenarios may include, but is not limited to, all storage drives powering up at once, one drive powering up, a subset of a plurality of storage drives powering up based on an access request, the states of the storage drives (e.g., an initial power-up state, idle state, initial read/write state, sustained read/write, or the like), or the like. The determined schedule can indicate—for each separate storage drive (or each separate storage drive of a subset of storage drives)—a power-up sequence to employ and a time for when to initiate that power-up sequence. In some embodiments, the schedule may be provided to each controller to instruct each corresponding controller when and what sequence to employ to power up its correspondingly coupled storage drive. In at least one such embodiment, a scheduling controller may inform each controller separately of a time (e.g., based on a system clock or a wait time) when it can power up its corresponding drive and a sequence particular to that drive (for that schedule) for how to power up the drive.

In various embodiments, the power-up sequence(s) and/or power-up schedule may be optimized to minimize the risks and/or issues created from spikes in power consumption as storage drives are powered on. In particular, mechanical drives (e.g., HDDs) may have an initial spike in power consumption when they turn on due to the electrical properties of powering up the motor to drive the disk. This power consumption can be compared to that of SSDs, which typically is more of a step function when the drive is initially powered up. Accordingly, in some embodiments, it may be beneficial to power up the HDDs prior to the SSDs. Similarly, it may be beneficial for some drives of one type (e.g., one or more) to power on before other drives (e.g., one or more) of the same type. This staggering of power ups can allow each power spike to subside before another storage drive is powered on, which can further reduce the issues that can arise from a spike in power consumption.

For example, assume a chassis has five storage drives, two HDD and three SSD (each of the same form factor—noting that different form factors may have different power consumption characteristics, which may change the power-up schedule (and/or sequence for each storage drive)). Based on the typical power consumption profile of the different storage drives, the schedule may indicate that the HDDs power up five milliseconds apart, followed by the SSD, each separated by two milliseconds, which may produce the power-up schedule HDD_1→five millisecond delay→HDD_2→five millisecond delay→SSD_1→two millisecond delay→SSD_2→two millisecond delay→SSD_3. In various embodiments, when each of these storage drive's is powered up according to the schedule, each may be powered up according to its own sequence (e.g., at different rates) as determined when the schedule is determined. It should be noted that this schedule and sequences is for illustration purposes and should not be limiting. Also, it should be noted that the power consumption profile of an individual drive may change over time, and in some embodiments, the corresponding controller may store the power consumption profile history so that this change can be tracked and employed to determine future power-up schedules and/or sequences.

In various embodiments, some schedules may indicate that a plurality of storage drives can power up at the same time (i.e., synchronous power ups). In some embodiments, the controllers may determine a number of storage drives that can be power up at the same time. In at least one of various embodiments, this number may be a predetermined number, such as determined by the chassis manufacturer, storage drive manufacturer, controller manufacturer, or the like. In other embodiments, the number of simultaneous drive power ups may be provided by a remove device, such as network computer 102-105 of FIG. 1. In at least one embodiment, the number of simultaneous drive power ups may be dependent on an amount of total current that can be supplied by the chassis and/or the power source.

In various embodiments, the controllers may utilize the number of drives that can be simultaneously turned on to determine the order for turning on the drives. In some embodiments, the order may be based on a priority scheme (e.g., a drive being currently accesses (or repeatedly access) may be powered on before other drives, data drives may turn on before parity/backup drives, or the like), a physical location of each drive in the chassis, type of drive (as described above), randomly, or the like. Although embodiments are primarily described as controllers of a single chassis communicating with each other, embodiments are not so limited, but rather, controllers from a plurality of chassis may collectively communicate with each other to at least determine the power-up schedule for a plurality of storage drives in a plurality of chassis.

Other factors that may also impact the power-up schedule. For example, the controllers may detect that the backplane/chassis is not providing a constant power supply or at a lower level than desired (e.g., the power supply may be old and worn out, the facility housing the chassis may have fluctuating power, or the like). The controller may use this information to further stagger or alter the power-up sequence of the storage drives. In another example, the physical location of the storage drives in the chassis (or on another chassis) may be used to modify the power-up sequence. In one non-limiting example, the schedule may indicate that storage drives physically separated by a given number of other drives may be powered on at the same time, while storage drives physically next to each other may have an additional power up delay.

Since each controller can manage the power supplied to its corresponding storage drive, and since there is no need for the drives to be of a uniform type (or model, or from a same manufacturer), the controllers as a group can determine and employ a power-up schedule that can allow one or more of the storage drives to power up before other storage drives are powered up.

In any event, process 1000 may proceed to decision block 1010, where a determination may be made whether an access request has been received by one or more controllers. If an access request has been received, then process 1000 may flow to block 1012; otherwise, process 1000 may loop to decision block 1010 to wait for an access request.

At block 1012, an optimal power-up sequence may be employed for each storage drive associated with the access request. In some embodiments, each controller that may be utilized to provide access to the data requests may separately employ the determined power-up sequence—in accordance with a power-up schedule—for its correspondingly coupled storage drive.

After block 1012, process 1000 may return to a calling process to perform other actions. As described herein, once a controller is powered on, it may provide various diagnostics of its corresponding storage drive. Such diagnostics may include, but are not limited to, power consumption monitoring, temperature monitoring, or the like. Controllers may communicate this information to each other (to perform group-wide diagnostics and storage management) or to another network computer.

Figure 11:
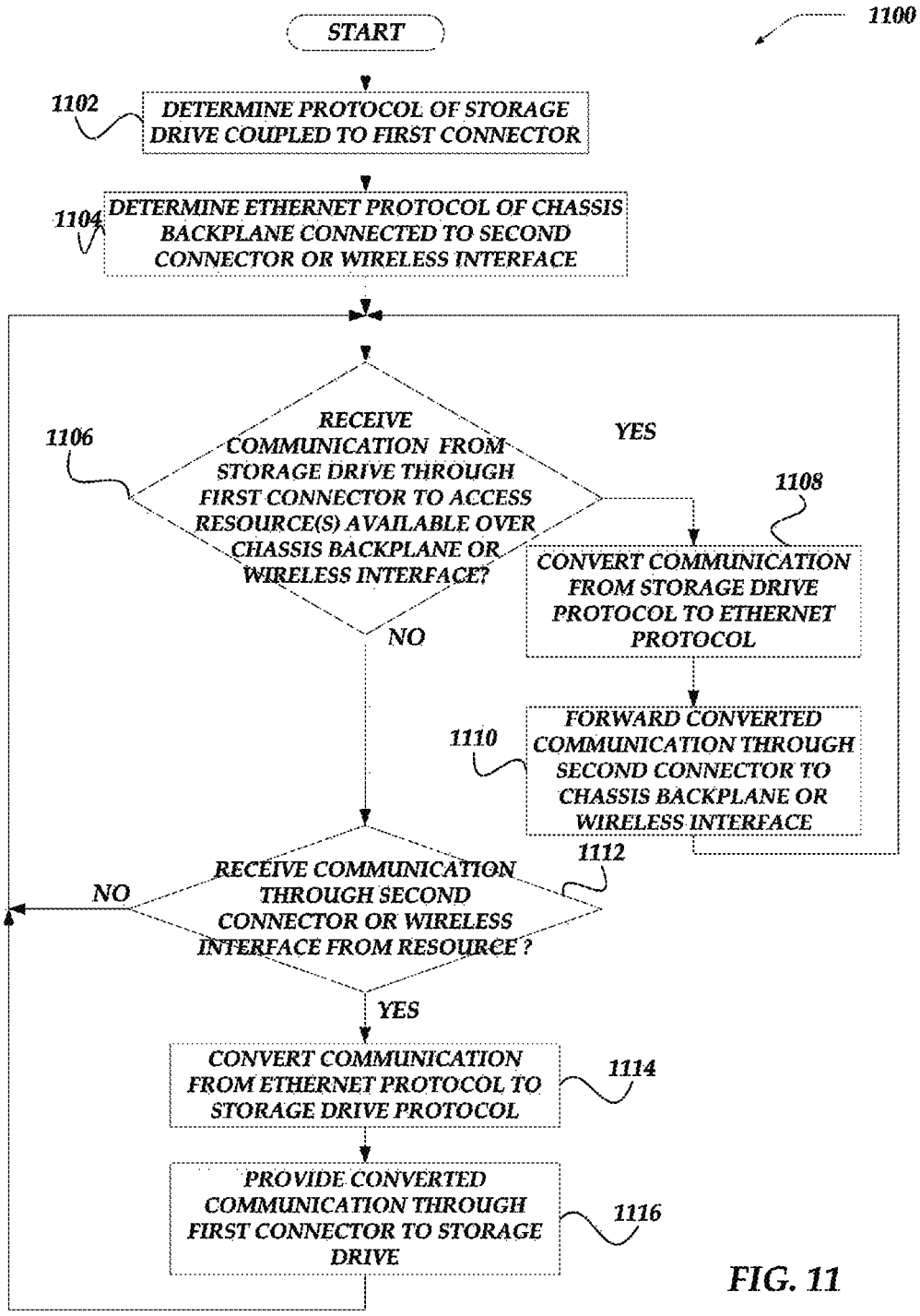
FIG. 11 illustrates a logical flow diagram generally showing an embodiment of a process for managing a storage drive in accordance with embodiments described herein.

FIG. 11 illustrates a logical flow diagram generally showing an embodiment of a process for managing a storage drive in accordance with embodiments described herein. Process 1100 may be employed by a controller (e.g., controller 406 of FIGS. 4A-4F) coupled to a storage drive and multi-storage-drive chassis, as described herein. In various embodiments, each separate controller may employ embodiments of process 1200.

Process 1100 may being, after a start block, at block 1102, where a protocol of the storage drive coupled to the first connector may be determined. In some embodiments, the controller may determine the storage drive protocol based on a type of storage-drive connector (or first connector 408 of FIGS. 4A-4F), type of storage drive, or the like.

Process 1100 may proceed to block 1104, where an Ethernet protocol supported by the chassis backplane coupled to the second connector may be determined. In some embodiments, the controller may determine the Ethernet protocol based on a configuration of the controller's wireless interface. In other embodiments, the controller may determine the Ethernet protocol based on a type of a backplane connector (or second connector 410 of FIGS. 4A-4F). In some embodiments, the pin configuration of the backplane connector may determine the type of Ethernet protocol that can be supported by the chassis. In other embodiments, the connector may query the chassis to determine what its supported Ethernet protocol. In yet other embodiments, the Ethernet protocol may be hardcoded or pre-determined in the controller. In yet other embodiments, the Ethernet protocol may be determined by a radio adapter in communication with the wireless interface of the controller.

In various embodiments, the controller may self-configure by performing blocks 1102 and 1104 (in any order) upon power up.

Once configured, process 1100 may continue at decision block 1106, where a determination may be made whether a communication has been received from the storage drive through the first connector. In various embodiments, this communication may be to access a resource(s) available over the wireless interface or the chassis backplane. In some embodiments, these resource(s) may be network computers (e.g., a client computer, administrator, master read/write coordinator, or the like), other controllers, other storage drives, or the like, or a combination thereof. In some embodiments, the received communications may be a response to a read request (e.g., read data), other information/data provided by the storage drive to the controller, or virtually any other type of communication that can be output from a storage drive. If a communication has been received through the first connector, then process 1100 may flow to block 1108; otherwise, process 1100 may flow to decision block 1112.

At block 1108, the communication received from the storage drive may be converted from the determined storage drive protocol into the determined Ethernet protocol. In some embodiments, this conversion may include bundling the storage drive communication into the payload of one or more packets, or the like. In various embodiments, the controller may not convert the communication from the storage drive, but may simply forward it to a requesting resource/device.

Process 1100 may next proceed to block 1110, where the converted communication may be forwarded (e.g., output) through the wireless interface or the second connector to the chassis backplane (i.e., the Ethernet switch fabric interface). In various embodiments, the chassis may intercept this converted communication and output it through an Ethernet port/interface to remote network computers. In other embodiments, other controllers may obtain/intercept the converted communication directly off the Ethernet switch fabric interface (and perform an action accordingly). In other embodiments, the radio adapter may wirelessly receive, from the controller's wireless interface, the converted communication which it forwards over an Ethernet interface to a network for one or more remote network computers.

After block 1110, process 1100 may loop to decision block 1106 to wait for receipt of additional communications.

If, at decision block 1106, a communication is not received through the first connector, process 1100 may flow from decision block 1106 to decision block 1112, where a determination may be made whether a communication has been received through the wireless interface or the second connector over the chassis backplane. In various embodiments, the received communication may be from a resource available over the wireless interface or the chassis backplane that can communicate via an Ethernet protocol, including, but not limited to other controllers, network computers, chassis components, or the like.

In some embodiments, the received communication may be from another controller (e.g., storage drive parameters/power-up sequence(s) for determining a power-up schedule (e.g., as described in conjunction with FIG. 10); data reads/write requests; storage-drive monitoring information (e.g., as described in conjunction with FIG. 12); or the like). In other embodiments, this communication may be from a network computer (e.g., network computers 102-105 of FIG. 1). In at least one such embodiment, the communication may include, but is not limited to, read/write requests, status checks, storage drive information (e.g., currently monitor performance information), or virtually any other type of communication that can be input to a storage drive, or the like. In yet other embodiments, this communication may be from a chassis component (e.g., a power-supply of the chassis). It should be noted that other types of communications may be received—through the second connector coupled to the chassis—from resources available over the chassis backplane. Also, it should be noted that other types of communications may be received—through the wireless interface—from resources available through the radio adapter, such as resources available through other radio adapters or controllers in the chassis. If a communication has been received through the second connector, then process 1100 may flow to block 1114; otherwise, process 1100 may loop to decision block 1106 to wait for receipt of additional communications.

At block 1114, the communication received from the chassis may be converted from the determined Ethernet protocol into the determined storage drive protocol. In some embodiments, this conversion may include removing packet information to obtain the payload. In some embodiments, the payload may include the read and/or write request from a remote network computer. In various embodiments, the controller may not convert the communication from the chassis, but may simply forward it to the storage drive.

Process 1100 may next proceed to block 1116, where the converted communication may be provided (e.g., output) to storage drive through the second connector. In various embodiments, the converted communication may include instructions for accessing and/or writing to the storage drive, which can be provided to the storage drive through the second connector.

After block 1116, process 1100 may loop to decision block 1106 to wait for receipt of additional communications.

Figure 12:
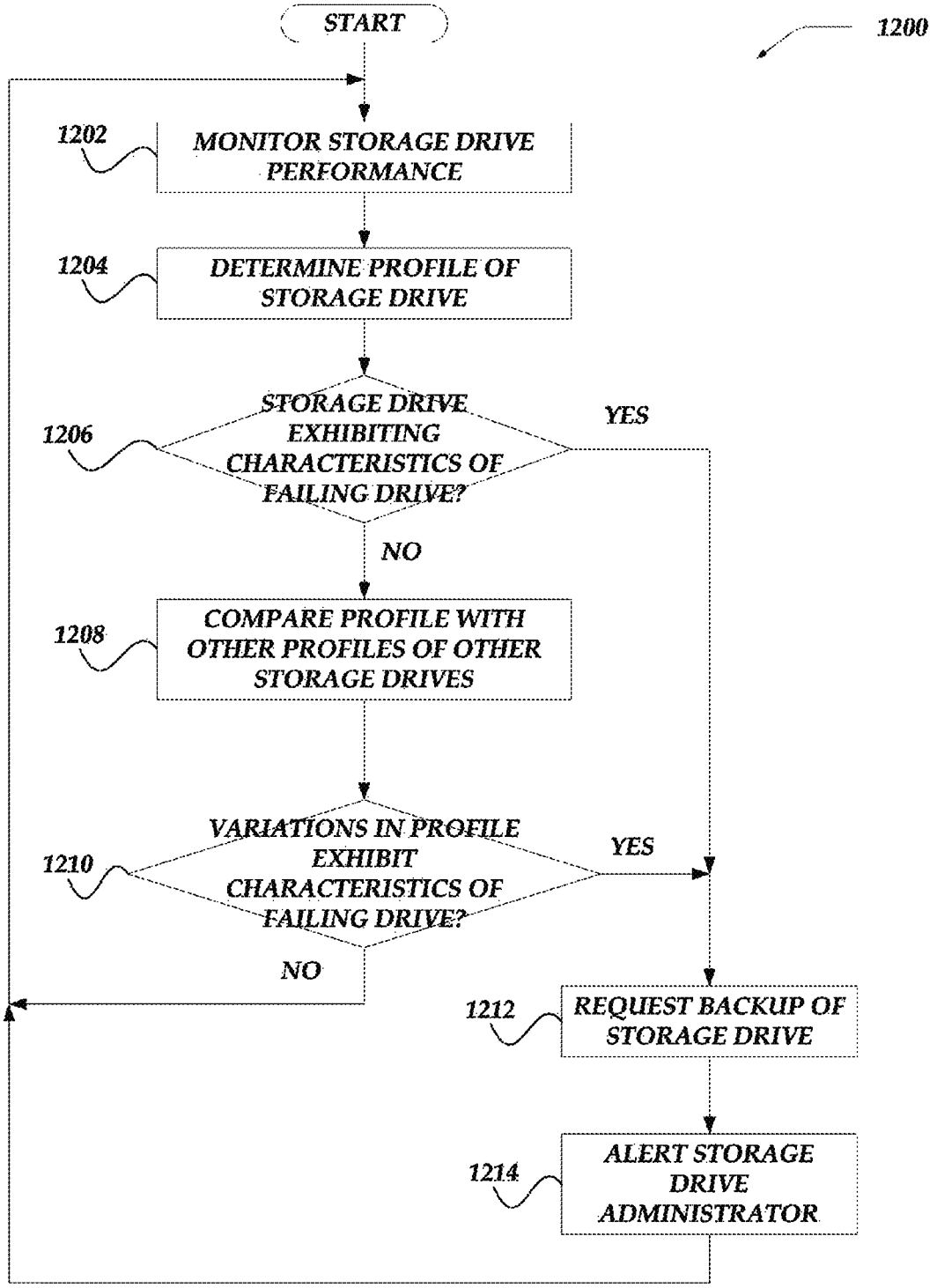
FIG. 12 illustrates a logical flow diagram generally showing an embodiment of a process for monitoring a storage drive in accordance with embodiments described herein.

FIG. 12 illustrates a logical flow diagram generally showing an embodiment of a process for monitoring a storage drive in accordance with embodiments described herein. Process 1200 may be employed by a controller coupled to a storage drive and chassis, as described herein. In various embodiments, each separate controller may employ embodiments of process 1200.

Process 1200 may begin, after a start block, at block 1202, where the controller may monitor the performance of its correspondingly coupled storage drive. In some embodiments, the monitored performance may include, but is not limited to, power consumption, temperature, drive response latency (e.g., how long did it take to respond to a read request), or the like.

Process 1200 may proceed to block 1204, where a profile of the drive performance may be determined. In some embodiments, this profile may include statistics, heuristics, trends, or the like, of the monitored performance.

Process 1200 may continue at decision block 1206, where a determination may be made whether the storage drive is exhibiting characteristics of a failing drive based on its monitored profile. In some embodiments, a temperature above a predetermined threshold value for a given period of time may indicate that the drive is about to or prone to fail. In other embodiments, changes over time in power consumption behavior may indicate that the drive is exhibiting characteristics of a failing drive. In yet other embodiments, changes in latency can also indicate that a drive is failing. It should be understood that these performance measurements may be employed singularly, or in some combination thereof, to determine if the drive is exhibiting characteristics of a failing drive. In various embodiments, exhibiting characteristics of a failing drive may include irregularities with the drive, imminent failures, or the like.

If the drive is exhibiting characteristics of a failing drive, then process 1200 may flow to block 1212; otherwise, process may flow to block 1208. At block 1208, the storage drive profile may be compared with other profiles of other storage drives. These other storage drives may be on a same chassis, different chassis, at a different data center facility in a different part of the country or world. In various embodiments, the profiles of similar storage drive types, models, manufacturers, or the like, or a combination thereof, may be compared. For example, in some embodiments, only profiles of a given storage drive type of a particular model may be compared. While in other embodiments, profiles of multiple different storage drive types of different models from different manufactures may be compared. However, embodiments are not so limited and other drive parameters may be employed to determine which profiles to compare.

Process 1200 may proceed next to decision block 1210, where a determination may be made whether variations in the profile—compared to other profiles—exhibit characteristics of a failing drive. In some embodiments, a temperature of a given drive may not be above a threshold value (e.g., as determined at decision block 1206), but when compared to other storage drives, it is continuously running at a higher temperature. This higher comparative temperature may indicate that the storage drive may be failing (or at least performing at a lower standard that the other storage drives), especially if the storage drive had less data accesses than the other storage drives (because the more data accesses, the more likely an increase in temperature). However, embodiments are not so limited, and other variations in the profile compared to other profiles may indicate that the drive is failing.

Similarly, storage drive profile comparisons across multiple chassis can indicate if a chassis may be experiencing issues. For example, if the voltage provided to each drive in a chassis is below other chassis, then the chassis may be experiencing issues with its power supply. It should be noted that these examples are not to be construed as limiting, and other storage drive profile comparisons may be made to determine if a storage drive and/or chassis has reduced performance, is having issues, or is potentially failing.

If variations in the profile indicate that the drive may be failing, then process 1200 may flow to block 1212; otherwise, process 1200 may loop to block 1202 to continue to monitor the storage drive performance.

At block 1212, a backup of the potentially failing storage drive may be requested. In some embodiments, this request may be provided to an administrator of the storage drive (and/or chassis). In other embodiments, the controller may request a backup and may coordinate with other controllers to back up the data onto other storage drives. In other embodiments, a chassis may include a spare storage drive (and controller, as described herein) to which the data from the failing drive may be automatically copied (without intervention by the administrator).

Process 1200 may continue at block 1214, where an alert may be provided to the storage drive administrator. In various embodiments, this alert may notified the administrator of the potentially failing drive. In some embodiments, the administrator may be enabled to determine what to do with the failing drive. For example, the administrator may be provided all the profile performance characteristics and/or comparisons with other profiles, and may make the decision as to whether drive really is failing. In some embodiments, the administrator may provide the controller with instructions on how to proceed with the potentially failing drive (e.g., continue to monitor, copy the storage data to a spare drive or other drives in the chassis (or another chassis), or the like).

In some embodiments, the controller may instruct other controllers to halt future data writes to the potentially failing storage drive. In various embodiments, the controller may notify other controllers in the chassis (or associated with other chassis) of the potential problem with its storage drive, and the other controllers may modify writing procedures to divert future write requests away from the failing drive.

In various embodiments, blocks 1212 and/or 1214 may be optional and may not be performed. For example, in some embodiments, the controller may notify the administrator, but may not take any pre-failure steps (e.g., automatically backup of the potentially failing drive). In other embodiments, only the potentially failing storage drive may be backed up, but no other actions. However, embodiments are not so limited and other actions may be taken on the potentially failing drive.

After block 1214, process 1200 may look to block 1202 to continue to monitor the storage drive's performance.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A wireless controller computer, comprising:

a first connector that is operative to be coupled with a storage-drive connector of a storage drive;

a wireless interface that is operative to wirelessly communicate via a waveguide, located in a multi-storage-drive chassis, with one or more other wireless controller computers and a radio adapter that provides communication over a network with one or more network computers;

a memory device for storing instructions;

a processor device that is operative to execute the instructions to perform actions, including:

converting at least a portion of communication received through the first connector from a storage-drive protocol into an Ethernet protocol for output through the wireless interface;

converting at least a portion of communication received through the wireless interface from the Ethernet protocol into the storage-drive protocol for output through the first connector;

wirelessly communicating with one or more other wireless controller computers to cooperatively manage operation of the storage drive and one or more other storage drives correspondingly coupled to the one or more other wireless controller computers;

monitoring performance of the storage drive;

generating a [profile] *plurality of profiles* for the storage drive based on the monitored performance *of power consumption for a plurality of states of the storage drive, wherein the plurality of states include a start-up state, an idle state, an initial access state, and a sustained read/write state*;

determining if the storage drive is potentially failing based on variations in the storage drive's [profile] *plurality of profiles* as compared to *other* profiles for the one or more other storage drives that is correspondingly coupled to *the* one or more other wireless controller computers; and providing an alert regarding the determined potentially failing storage drive.

2. The wireless controller computer of claim 1, wherein the wireless controller computer is operative to communicate—independent of the radio adapter—with the one or more other wireless controller computers to manage power-up sequences of the storage drive and the [at least] one *or more* other storage [drive] *drives* correspondingly coupled with the one or more other wireless controller computers.

3. The wireless controller computer of claim 1, wherein the wireless controller computer is operative to communicate—independent of the radio adapter—with the [at least] one or more other wireless controller computers to manage distributed data storage and recovery between the storage drive and the one or more other storage drives correspondingly coupled with the one or more other wireless controller computers.

4. The wireless controller computer of claim 1, wherein the wireless controller computer enables the storage drive to be network addressable independent and separate from other storage drives.

5. The wireless controller computer of claim 1, further comprising:

at least one storage drive is a different type than another type of the storage drive; and a physical shape of the wireless controller computer is operative to fit adjacent to the storage-drive connector and occupy less space than is bounded by peripheral edges of an end of a separate housing of the storage drive coupled to the storage-drive connector.

6. The wireless controller computer of claim 1, wherein the processor device is operative to execute further instructions to perform further actions, comprising:

determining [a profile] *additional information that is included in the plurality of profiles* of the storage drive, wherein the [profile] *additional information* includes at least a history of one or more of *the plurality of states of* power consumption, temperature, [or] *and* latency of the storage drive; and determining when the storage drive is exhibiting failure characteristics based on a comparison of the [profile]

*plurality of profiles of the storage drive* to [with] *the* other profiles of *the one or more* other storage drives.

[7. The wireless controller computer of claim 1, wherein communicating with the one or more other wireless controller computers includes:

communicating with one or more of the other wireless controller computers or a network computer to cooperatively manage operation of the storage drive and the at least one other storage drive.]

8. The wireless controller computer of claim 1, wherein the first connector is a Serial Advanced Technology Attachment (SATA) connector, and wherein the wireless interface supports at least one standard protocol, including WiFi (IEEE 802.11), Bluetooth (IEEE 802.15.1), WiMax (IEEE 802.16), or MiWi (IEEE 802.15.4).

9. The wireless controller computer of claim 1, wherein the processor device is operative to execute further instructions to perform further actions, comprising:

providing a request to backup the storage drive to an administrator of the storage drive;

alerting the administrator of the storage drive of a potentially failing storage drive; and modifying an amount of power supplied to the storage drive.

10. The wireless controller computer of claim 1, wherein the processor device is operative to execute further instructions to perform further actions, comprising:

determining one or more parameters of the storage drive;

determining a power supply of the multi-storage-drive chassis;

determining one or more power-up sequences for the storage drive based on the determined storage drive parameters and the determined power supply; and employing one of the one or more power-up sequences that is optimal based on a request to access data on at least the storage drive.

11. A system for managing operation of a plurality of storage drives, comprising:

a wireless multi-storage-drive chassis, including:

a power supply for supplying power to the plurality of storage drives and a plurality of wireless controller computers that are correspondingly coupled to each storage drive;

a backplane for enabling communication with each storage drive located within the chassis;

a radio adapter for providing wireless communication between each wireless controller computer and communication over a network with a network computer; and each of the plurality of wireless controller computers, including:

a first connector that is operative to be coupled with a storage-drive connector of a storage drive[;], a wireless interface that is operative to wirelessly communicate via a waveguide with the radio adapter and one or more other wireless controller computers;

a memory device for storing instructions;

a processor device that is operative to execute the instructions to perform actions, including:

converting one or more portions of communication received through the first connector from a storage-drive protocol into an Ethernet protocol for output through the wireless interface;

converting one or more portions of communication received through the wireless interface from the Ethernet protocol into the storage-drive protocol for output through the first connector;

communicating with one or more other wireless controller computers to cooperatively manage operation of the storage drive and one or more other storage drives correspondingly coupled to *the* one or more other wireless controller computers;

monitoring performance of the storage drive;

generating a [profile] *plurality of profiles* for the storage drive based on the monitored performance *of power consumption for a plurality of states of the storage drive, wherein the plurality of states include a start-up state, an idle state, an initial access state, and a sustained read/write state*;

determining if the storage drive is potentially failing based on variations in the storage drive's [profile] *plurality of profiles* as compared to *other* profiles for the one or more other storage drives that is correspondingly coupled to *the* one or more other wireless controller computers; and providing an alert regarding the determined potentially failing storage drive.

12. The system of claim 11, wherein each wireless controller computer is operative to communicate—independent of the radio adapter—with *the* one or more other wireless controller computers to manage power-up sequences of the storage drive and *the* one or more other storage drives correspondingly coupled with the one or more other wireless controller computers.

13. The system of claim 11, wherein each wireless controller computer is operative to communicate—independent of the radio adapter—with *the* one or more other wireless controller computers to manage distributed data storage and recovery between the storage drive and *the* one or more other storage drives correspondingly coupled with the one or more other wireless controller computers.

14. The system of claim 11, wherein each wireless controller computer enables the storage drive to be network addressable independent and separate from other storage drives.

15. The system of claim 11, further comprising:

one or more storage drives is a different type than another type of the storage drives; and a physical shape of the wireless controller computer is operative to fit adjacent to the storage-drive connector and occupy less space than is bounded by peripheral edges of an end of a separate housing of the storage drive coupled to the storage-drive connector.

16. The system of claim 11, wherein the processor device is operative to execute further instructions to perform further actions, comprising:

determining [one or more] *additional information that is included in the plurality of* profiles of the storage drive, wherein the [profile] *additional information* includes [one or more of] *at least* a history of one or more of *the plurality of states of* power consumption, temperature, [or] *and* latency of the storage drive; and determining when the storage drive is exhibiting failure characteristics based on a comparison of the [one or more profile] *plurality of profiles of the storage drive* to *the* other profiles [determined for] *of the one or more* other storage drives.

[17. The system of claim 11, wherein communicating with the one or more other wireless controller computers includes:

communicating with one or more other wireless controller computers or a network computer to cooperatively manage operation of the storage drive and one or more other storage drives.]

18. The system of claim 11, wherein the first connector is a Serial Advanced Technology Attachment (SATA) connector and the wireless interface supports at least one standard protocol, including WiFi (IEEE 802.11), Bluetooth (IEEE 802.15.1), WiMax (IEEE 802.16), or MiWi (IEEE 802.15.4).

19. The system of claim 11, wherein the processor device is operative to execute further instructions to perform further actions, comprising:

providing a request to backup the storage drive to an administrator of the storage drive;

alerting the administrator of the storage drive of a potentially failing storage drive; and modifying an amount of power supplied to the storage drive.

20. The system of claim 11, wherein the processor device is operative to execute further instructions to perform further actions, comprising:

determining one or more parameters of the storage drive;

determining a power supply of the multi-storage-drive chassis;

determining one or more power-up sequences for the storage drive based on the determined storage drive parameters and the determined power supply; and employing one of the one or more power-up sequences that is optimal based on a request to access data on the storage drive.

21. A method for employing a wireless controller computer to manage operation of a storage drive coupled to the wireless controller computer in a wireless multi-storage-drive chassis, wherein the wireless controller computer performs actions, comprising:

converting one or more portions of communication received through a first connector of the wireless controller computer from a storage-drive protocol into an Ethernet protocol for output through a wireless interface of the wireless controller computer, wherein the first connector is operative to be coupled with a storage-drive connector of the storage drive;

converting one or more portions of communication received through the wireless interface from the Ethernet protocol into the storage-drive protocol for output through the first connector, wherein the wireless interface is operative to communicate wirelessly via a waveguide with a radio adapter that provides communication over a network with one or more network computers[;], wirelessly communicating with one or more other wireless controller computers to cooperatively manage operation of the storage drive and one or more other storage drives correspondingly coupled to one or more other wireless controller computers;

monitoring performance of the storage drive;

generating a [profile] *plurality of profiles* for the storage drive based on the monitored performance *of power consumption for a plurality of states of the storage drive, wherein the plurality of states include a start-up state, an idle state, an initial access state, and a sustained read/write state*;

determining when the storage drive is potentially failing based on variations in the storage drive's [profile] *plurality of profiles* as compared to *other* profiles determined for one or more other storage drives that is correspondingly coupled to the one or more other wireless controller computers; and providing an alert regarding the determined potentially failing storage drive.

22. The method of claim 21, wherein the wireless controller computer performs further actions, including:

providing a request to backup the storage drive to an administrator of the storage drive;

alerting the storage drive administrator of the potentially failing storage drive; and modifying an amount of power supplied to the storage drive.

23. The method claim 21, wherein the wireless controller computer performs further actions, including:

determining one or more parameters of the storage drive;

determining a power supply of the multi-storage-drive chassis;

determining one or more power-up sequences for the storage drive based on the determined storage drive parameters and the determined power supply; and employing one of the one or more power-up sequences that is optimal based on a request to access data on at least the storage drive.

24. The method of claim 21, wherein communicating with one or more other wireless controller computers, includes:

communicating—independent of the radio adapter—with the one or more other wireless controller computers to manage power-up sequences of the storage drive and the one or more other storage drives correspondingly coupled with *the* one or more other wireless controller computers.

25. The method of claim 21, wherein communicating with the one or more other wireless controller computers, includes:

communicating—independent of the radio adapter—with the one or more other wireless controller computers to manage distributed data storage and recovery between the storage drive and the one or more other storage drives correspondingly coupled with the one or more other wireless controller computers.

26. The method of claim 21, wherein the storage drive is independently network addressable and separate from other storage drives, and wherein a physical shape of the wireless controller computer is operative to fit adjacent to the storage-drive connector and occupy less space than is bounded by peripheral edges of an end of a separate housing of the storage drive coupled to the storage-drive connector.

27. The method of claim 21, wherein the wireless controller computer performs further actions, comprising:

determining [a profile] *additional information that is included in the plurality of profiles* of the storage drive, wherein the [profile] *additional information* includes at least a history of [at least] one *or more* of *the plurality of states of* power consumption, temperature, [or] *and* latency of the storage drive; and determining when the storage drive is exhibiting failure characteristics based on a comparison of the [profile] *plurality of profiles of the storage drive* to [with] *the* other profiles of *the one or more* other storage drives.

*28. A controller computer, comprising:*

*a first connector that is operative to be coupled with a storage-drive connector of a storage drive;*

*a second connector that is operative to be coupled to a non-wireless network interface of a multi-storage-drive chassis, wherein the controller computer communicates through the second connector over a network with one*

*or more wireless controller computers, one or more network computers, or one or more other controller computers;*

*one or more processors that perform actions that enable operations performed by the controller computer, including:*

*converting communication received by the first connector and the second connector between a storage-drive protocol presented at the first connector and a non-wireless network protocol presented at the second connector; and*

*enabling management of the operation of the storage drive;*

*monitoring performance of the storage drive;*

*generating a plurality of profiles for the storage drive based on the monitored performance of power consumption for a plurality of states of the storage drive, wherein the plurality of states include a start-up state, an idle state, an initial access state, and a sustained read/write state;*

*determining if the storage drive is potentially failing based on variations in the storage driver's plurality of profiles as compared to other profiles for one or more other storage drives that is correspondingly coupled to the one or more wireless controller computers or the one or more other controller computers; and*

*providing an alert regarding the determined potentially failing storage drive.*

*29. The controller computer of claim 28, wherein the one or more processors perform further actions, comprising communicating with the one or more wireless controller computers, the one or more network computers, or the one or more other controller computers to cooperatively manage operation of the storage drive and the one or more other storage drives coupled to their corresponding wireless controller computer or other controller computer.*

*30. The controller computer of claim 28, wherein the one or more processors perform further actions, comprising enabling the one or more network computers to independently address and manage the operation of the storage drive.*

*31. The controller computer of claim 28, wherein the one or more processors perform further actions, comprising enabling one of the one or more network computers to operate as a master network computer, wherein the master network computer provides independent instructions to one or more of the controller computer or the one or more wireless controller computers to operate as a slave and perform one or more of accessing data, saving data, deleting data, powering up its coupled storage drive, or depowering its coupled storage drive.*

*32. The controller computer of claim 28, wherein the network interface includes a wireless interface that enables communication with the one or more wireless controller computers or the one or more network computers.*

*33. A processor readable non-transitory storage media that includes instructions for a method for managing operations of a storage drive coupled to a controller computer over a network, wherein the controller computer employs one or more processors to execute the instructions to perform actions, comprising:*

*enabling operations performed by one or more network computers, including:*

*employing a first connector to couple with a storage-drive connector of the storage drive;*

*employing a second connector to couple with a non-wireless network interface of a multi-storage-drive chassis, wherein the controller computer communicates through the second connector over the network with one or more wireless controller computers, the one or more network computers, or one or more other controller computers;*

*converting communication received by the first connector and the second connector between a storage-drive protocol presented at the first connector and a non-wireless network protocol presented at the second connector; and*

*enabling management of the operation of the storage drive;*

*monitoring performance of power consumption of the storage drive;*

*generating a plurality of profiles for the storage drive based on the monitored performance of power consumption for a plurality of states of the storage drive, wherein the plurality of states include a start-up state, an idle state, an initial access state, and a sustained read/write state;*

*determining if the storage drive is potentially failing based on variations in the storage drive's plurality of profiles as compared to other profiles for one or more other storage drives that is correspondingly coupled to the one or more wireless controller computers or the one or more other controller computers; and*

*providing an alert, regarding the determined potentially failing storage drive.*

*34. The processor readable non-transitory storage media of claim 33, wherein the one or more processors execute the instructions to perform further actions, comprising:*

*communicating with the one or more wireless controller computers, the one or more network computers or the one or more other controller computers to comparatively manage operation of the storage drive and the one or more other storage drives coupled to their corresponding other controller computer or wireless controller computer.*

*35. The processor readable non-transitory storage media of claim 33, wherein the one or more processors execute the instructions to perform further actions, comprising:*

*enabling the one or more network computers to independently address and manage the operation of the storage drive.*

*36. The processor readable non-transitory storage media of claim 33, wherein the one or more processors execute the instructions to perform further actions, comprising:*

*enabling one of the one or more network computers to operate as a master network computer, wherein the master network computer provides independent instructions to one or more of the controller computer, the one or more wireless controller computers, or the one or more other controller computers to operate as a slave and perform one or more of accessing data, saving data, deleting data, powering up its coupled storage drive, or depowering its coupled storage drive.*

*37. The processor readable non-transitory storage media of claim 33, wherein the network interface includes a wireless interface that enables communication with the one or more wireless controller computers, the one or more network computers, or the one or more other controller computers.*

* * * * *